US012706093B2

(12) United States Patent
Jung et al.

(10) Patent No.: US 12,706,093 B2
(45) Date of Patent: Aug. 11, 2026

(54) ARTIFICIAL INTELLIGENCE DEVICE AND OPERATING METHOD THEREOF

(71) Applicant: LG ELECTRONICS INC., Seoul (KR)

(72) Inventors: Eun Kyung Jung, Seoul (KR); Sung Eun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 18/337,328

(22) Filed: Jun. 19, 2023

(65) Prior Publication Data

US 2024/0119930 A1 Apr. 11, 2024

(30) Foreign Application Priority Data

Oct. 7, 2022 (KR) ........................ 10-2022-0128890

(51) Int. Cl.

*G10L 15/16* (2006.01)
*G10L 15/22* (2006.01)
*G10L 17/04* (2013.01)
*G10L 25/78* (2013.01)

(52) U.S. Cl.

CPC .............. *G10L 15/22* (2013.01); *G10L 15/16* (2013.01); *G10L 17/04* (2013.01); *G10L 25/78* (2013.01)

(58) Field of Classification Search

CPC ......... G10L 15/22; G10L 15/16; G10L 17/04; G10L 17/24; G10L 17/18; G10L 2015/088; G10L 2015/223; G10L 15/32; G10L 25/78; G10L 15/08; G10L 15/02
USPC .......................................................... 704/232
See application file for complete search history.

(56) References Cited

U.S. PATENT DOCUMENTS 10,448,107 B2 * 10/2019 Kim ................... H04N 21/4722
11,455,989 B2 9/2022 Lee et al.
11,551,683 B2 * 1/2023 Lee ....................... G06F 1/3287
12,266,348 B2 * 4/2025 Choi ..................... G06F 1/3287
2014/0163978 A1 * 6/2014 Basye ..................... G10L 15/28 704/233

(Continued)

FOREIGN PATENT DOCUMENTS

KR 1020050053225 6/2005
KR 20090078503 7/2009

(Continued)

OTHER PUBLICATIONS

European Patent Office Application Serial No. 23168368.1, Search Report dated Mar. 5, 2024, 4 pages.

(Continued)

*Primary Examiner* — Vijay B Chawan
(74) *Attorney, Agent, or Firm* — LEE, HONG, DEGERMAN, KANG & WAIMEY

(57) ABSTRACT

Disclosed are an artificial intelligence device and a method for operating the same. An artificial intelligence device according to at least one embodiment of various embodiments of the present disclosure includes: a display; and a processor configured to control the display, wherein the processor is configured to: receive and register a first wake-up word; activate a voice recognition function when the registered first wake-up word is received, and transmit the first wake-up word to a server, wherein the first wake-up word is not a basic wake-up word embedded in the artificial intelligence device.

15 Claims, 23 Drawing Sheets

(56) References Cited

U.S. PATENT DOCUMENTS

| | | | | |
|---|---|---|---|---|
| 2016/0240194 | A1* | 8/2016 | Lee | G06F 1/3293 |
| 2018/0139502 | A1* | 5/2018 | Kim | H04N 21/44204 |
| 2019/0066680 | A1* | 2/2019 | Woo | G10L 15/22 |
| 2019/0173919 | A1* | 6/2019 | Irimie | H04L 63/1483 |
| 2019/0228767 | A1 | 7/2019 | Kim et al. | |
| 2019/0355365 | A1* | 11/2019 | Kim | G06F 1/3209 |
| 2021/0233556 | A1* | 7/2021 | Kashima | G10L 15/02 |
| 2021/0383811 | A1* | 12/2021 | Goscha | G10L 15/32 |
| 2022/0122592 | A1* | 4/2022 | Elkhatib | H03M 1/12 |
| 2023/0335118 | A1* | 10/2023 | Huang | G10L 15/063 |
| 2024/0119930 | A1* | 4/2024 | Jung | G06F 3/167 |

FOREIGN PATENT DOCUMENTS

| | | |
|---|---|---|
| KR | 1020190021143 | 3/2019 |
| KR | 1020190088737 | 7/2019 |
| KR | 1020200059054 | 5/2020 |

OTHER PUBLICATIONS

Korean Intellectual Property Office Application No. 10-2022-0128890, Office Action dated Mar. 17, 2025, 7 pages.

* cited by examiner

FIG. 6A
FIG. 6B
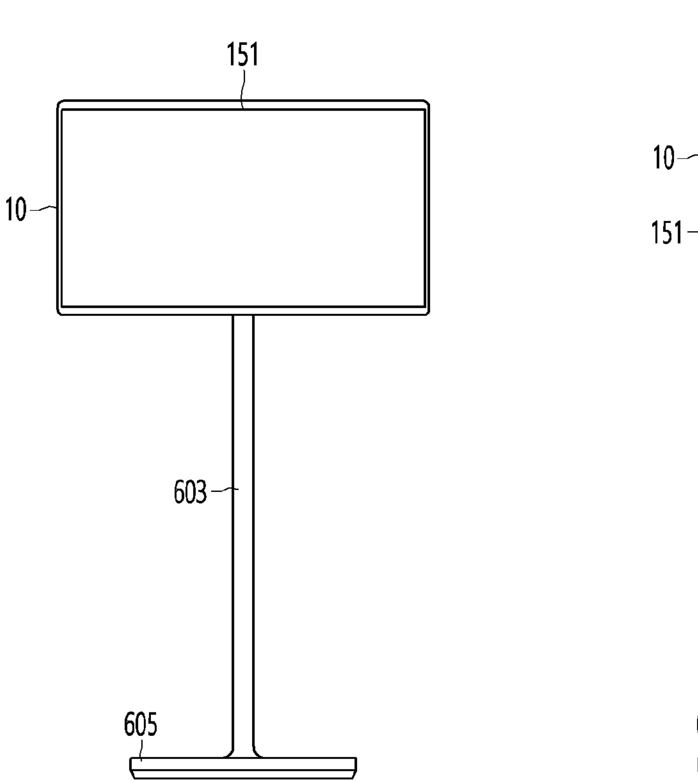
FIG. 7
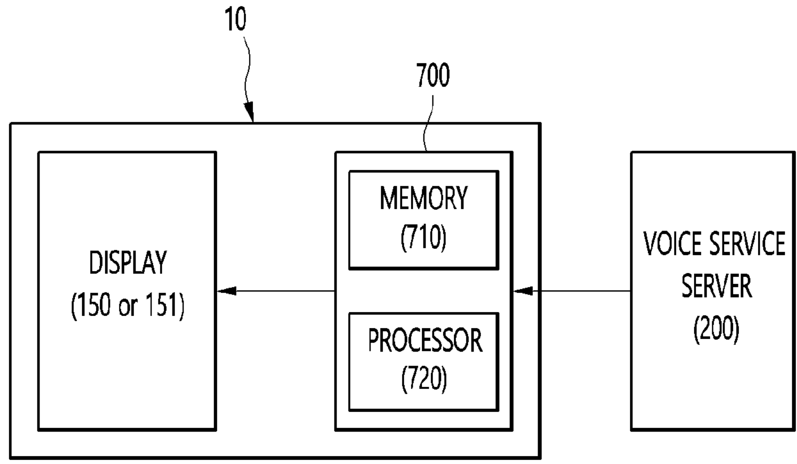

FIG. 11

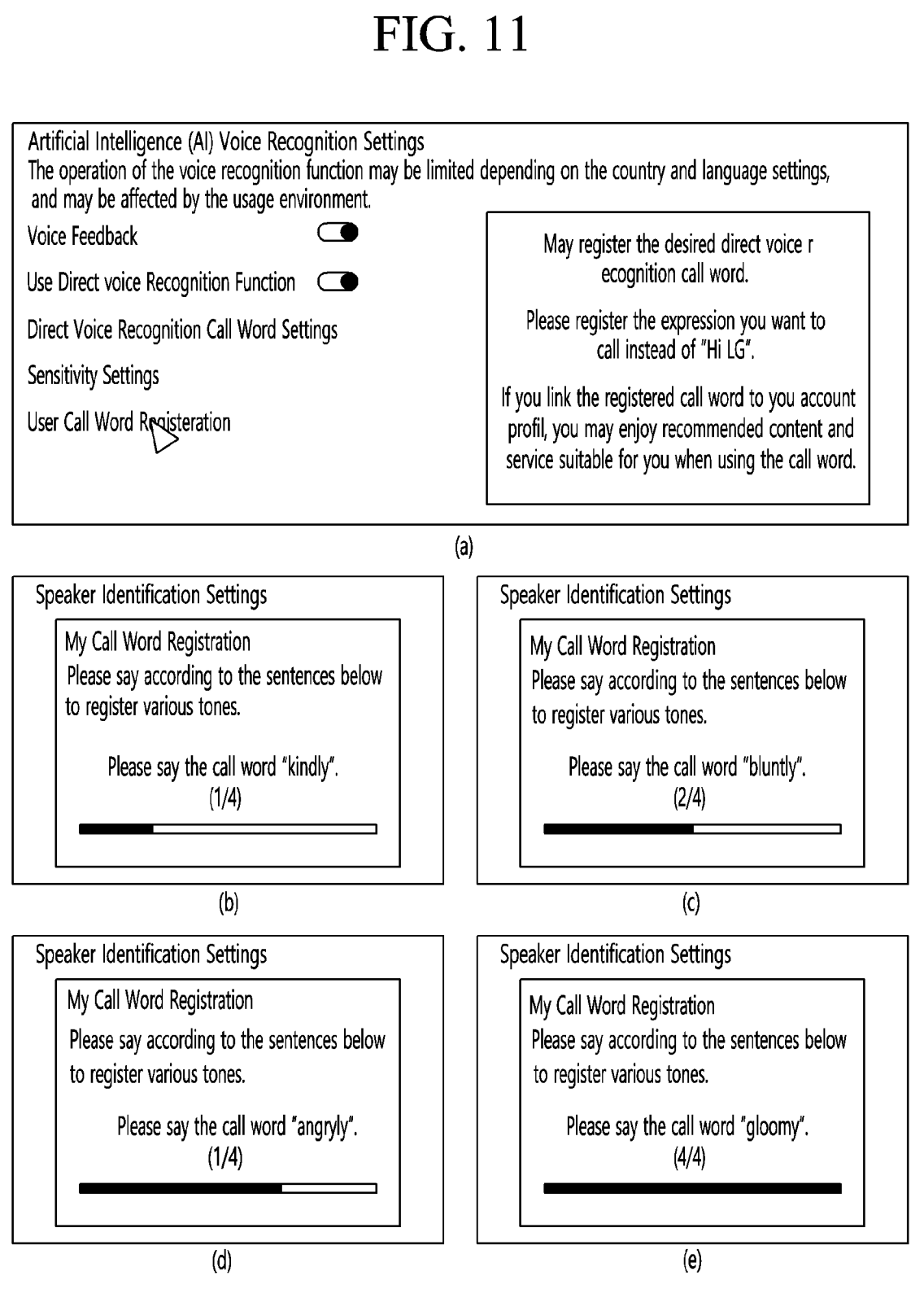

Artificial Intelligence (AI) Voice Recognition Settings
The operation of the voice recognition function may be limited depending on the country and language settings, and may be affected by the usage environment.

Voice Feedback

Use Direct voice Recognition Function

Direct Voice Recognition Call Word Settings

Sensitivity Settings

User Call Word Registeration

May register the desired direct voice r ecognition call word.

Please register the expression you want to call instead of "Hi LG".

If you link the registered call word to you account profil, you may enjoy recommended content and service suitable for you when using the call word.

(a)

Speaker Identification Settings

My Call Word Registration
Please say according to the sentences below to register various tones.

Please say the call word "kindly".
(1/4)

(b)

Speaker Identification Settings

My Call Word Registration
Please say according to the sentences below to register various tones.

Please say the call word "bluntly".
(2/4)

(c)

Speaker Identification Settings

My Call Word Registration
Please say according to the sentences below to register various tones.

Please say the call word "angryly".
(1/4)

(d)

Speaker Identification Settings

My Call Word Registration
Please say according to the sentences below to register various tones.

Please say the call word "gloomy".
(4/4)

(e)

| Family | Wake-up Word Defined By User |
|---|---|
| Father | Jjang-Gu Ya |
| Mother | TV Ya |
| Me | My Love |

(a)

(b)

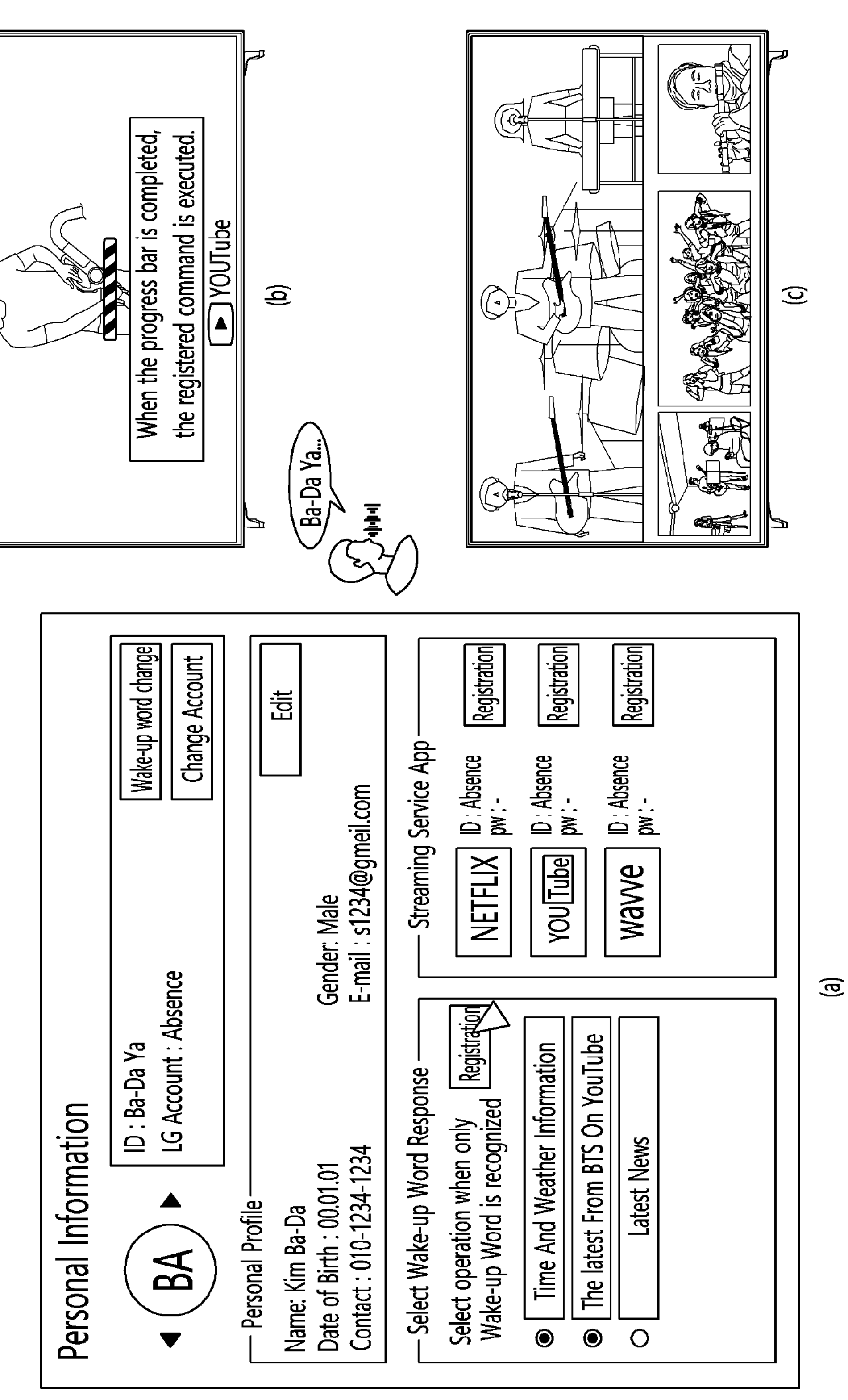
FIG. 17
Personal Information
BA
ID : Ba-Da Ya
LG Account : Absence
Wake-up word change
Change Account
Personal Profile
Name: Kim Ba-Da
Date of Birth : 00.01.01
Contact : 010-1234-1234
Gender: Male
E-mail : s1234@gmeil.com
Edit
Select Wake-up Word Response
Select operation when only Wake-up Word is recognized
Registration
Time And Weather Information
The latest From BTS On YouTube
Latest News
Streaming Service App
NETFLIX
ID : Absence
pw : -
Registration
YOUTube
ID : Absence
pw : -
Registration
wavve
ID : Absence
pw : -
Registration
(a)
Ba-Da Ya...
When the progress bar is completed, the registered command is executed.
YOUTube
(b)
(c)

FIG. 18
| Family | Command Registered Instead of Wake-up Word | Command actually executed |
|---|---|---|
| Father | Good morning! | Execute show me the latest news |
| Mother | Show me the baby-related contents | Execute play the Pororo song on Youtube |
| Me | Gonna see the movie | Volume 50, Change movie screen, Connect bluetooth speaker registered by me |
(a)
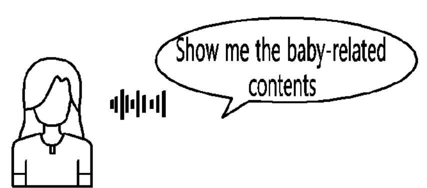
(b)

FIG. 20

FIG. 21
(a)
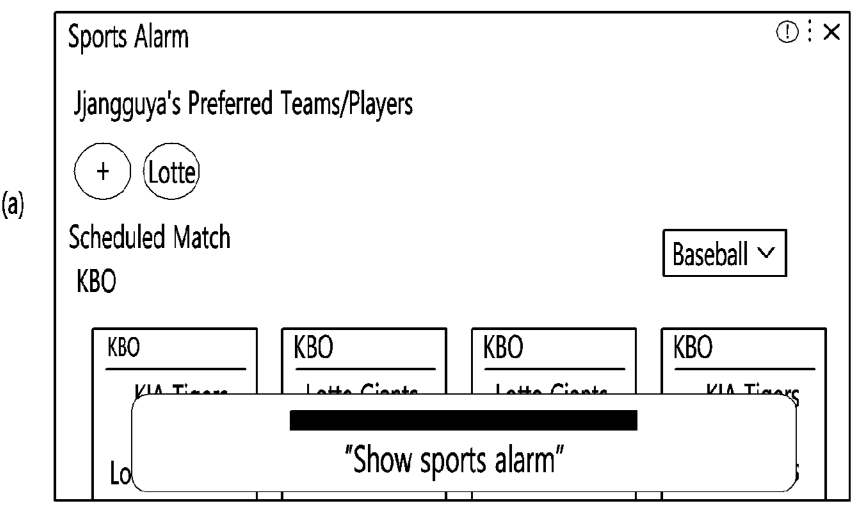
(b)
(c)
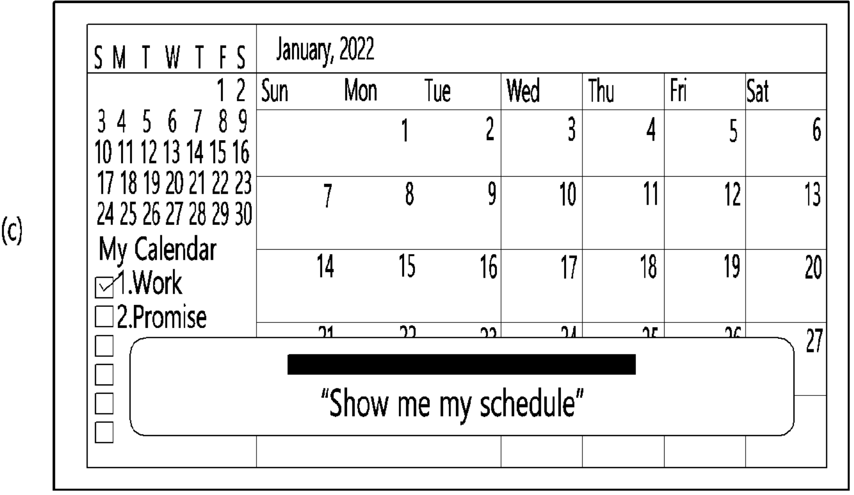

FIG. 23
(a)
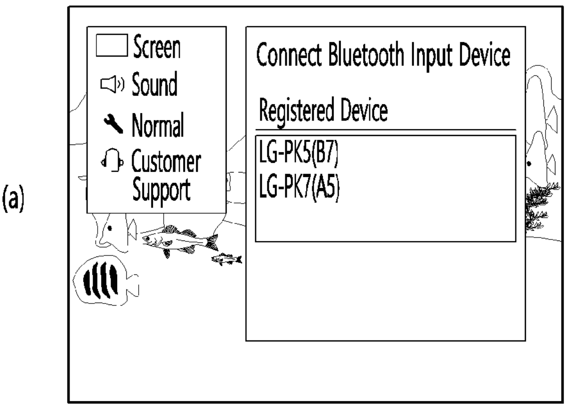
(b)
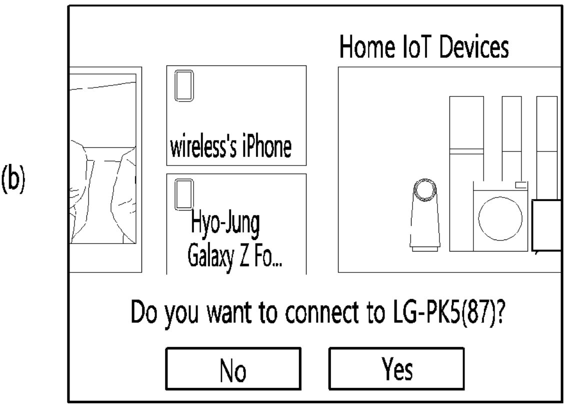
(c)
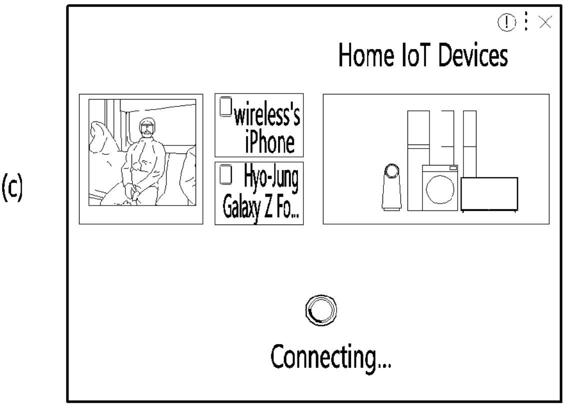

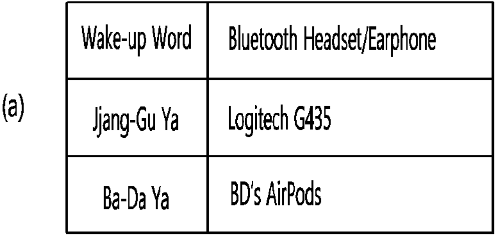

| Wake-up Word | Bluetooth Headset/Earphone |
|---|---|
| Jjang-Gu Ya | Logitech G435 |
| Ba-Da Ya | BD's AirPods |

(b) Utterance With Wake-up Word

"Jjang-gu ya connect the headset"

"Jjang-gu ya, connect the headset"

Connect "G435XX" registered as Jjang-gu

Server (c) General Utterance

"Connect the headset"

"Connect the headset"

Connect the recently registered headset
on the artificial intelligence device

ARTIFICIAL INTELLIGENCE DEVICE AND OPERATING METHOD THEREOF

CROSS-REFERENCE TO RELATED APPLICATION(S)

Pursuant to 35 U.S.C. § 119, this application claims the benefit of earlier filing date and right of priority to Korean Application No(s). 10-2022-0128890, filed on Oct. 7, 2022, the contents of which are all incorporated by reference herein in its entirety.

TECHNICAL FIELD

The present disclosure relates to an artificial intelligence device and a method for operating the same.

BACKGROUND ART

The competition for voice recognition technologies, which are started in smartphones, is expected to become full-fledged in the home in line with the full-fledged spread of the Internet of Things (IoT).

Particularly, what is noteworthy is that the device is an artificial intelligence (AI) device, which is capable of giving a command and has conversations through voice.

A voice recognition service has a structure that selects an optimal answer to a user's question by utilizing an enormous amount of database.

A voice search function also converts input voice data into text in a cloud server, analyzes the text, and retransmits real-time search results based on the result to the device.

The cloud server has computing power to classify numerous words into the voice data classified by gender, age, and accent, store the voice data and then process voice data in real time.

The voice recognition may become more accurate as more voice data is accumulated, to the level of human parity.

However, in the related art, in relation to the voice recognition, only wake-up words set and registered as defaults in the device may be used to cause inconvenience in the use of artificial intelligence devices.

DISCLOSURE OF THE INVENTION

Technical Problem

An object of the present disclosure is to solve the foregoing limitations and other limitations.

An object of the present disclosure is to provide an artificial intelligence device.

The present disclosure is to register and use a wake-up word defined by a user as a desired wake-up word according to personalities of various users using an artificial intelligence device.

The present disclosure is to register and use a wake-up word defined by a user so that various functions of an artificial intelligence device are more easily and conveniently used as a personalized device.

Technical Solution

An artificial intelligence device according to at least one embodiment of various embodiments of the present disclosure includes: a display; and a processor configured to control the display, wherein the processor is configured to: receive and register a first wake-up word; activate a voice recognition function when the registered first wake-up word is received, and transmit the first wake-up word to a server, wherein the first wake-up word is not a basic wake-up word embedded in the artificial intelligence device.

According to the artificial intelligence device according to at least one embodiment of various embodiments of the present disclosure, the processor may be configured to: provide a voice recognition agent so as to register the first wake-up word; and map and register the first wake-up word input through a speaker and the voice recognition agent.

According to the artificial intelligence device according to at least one embodiment of various embodiments of the present disclosure, the processor may be configured to process information of the speaker to be linked to the first wake-up word.

According to the artificial intelligence device according to at least one embodiment of various embodiments of the present disclosure, the information of the speaker may include at least one or more of account or login information, profile information, payment and subscription information, paid or free service or application information capable of being linked, external device information capable of being connected, and routine information.

According to the artificial intelligence device according to at least one embodiment of various embodiments of the present disclosure, the processor may be configured to control macro information to be generated and stored so that at least one command is automatically executed with respect to the first wake-up word.

According to the artificial intelligence device according to at least one embodiment of various embodiments of the present disclosure, the processor may be configured to: determine whether the registered first wake-up word is contained in a user input when the user input is received; and extract a command other than the first wake-up word from the user input so as to compare the extracted command with the macro information when the first wake-up word is contained in the user input.

According to the artificial intelligence device according to at least one embodiment of various embodiments of the present disclosure, when the received user input may include the first wake-up word, whether the command is received within a predetermined time is determined to: perform an operation related to a first function corresponding to the command when the command is received within the predetermined time; and perform an operation related to a second function when the command is not received within the predetermined time, wherein the second function is performed according to a second command with respect to any one of first commands registered in the macro of the first wake-up word.

A method for operating an artificial intelligence device according to at least one embodiment of various embodiments of the present disclosure includes: providing a voice recognition agent; receiving a first wake-up word through the voice recognition agent to register the received first wake-up word; and transmitting the first wake-up word to a server, wherein the first wake-up word is not a second wake-up word embedded in the artificial intelligence device.

According to the method for operating the artificial intelligence device according to at least one embodiment of various embodiments of the present disclosure, the receiving and registering of the first wake-up word may include: providing the voice recognition agent to register the first wake-up word; and mapping and registering the first wake-up word input through a speaker and the voice recognition agent.

According to the method for operating the artificial intelligence device according to at least one embodiment of various embodiments of the present disclosure, the mapping and registering of the first wake-up word through the speaker and the voice recognition agent may include processing information of the speaker to be linked to the first wake-up word.

According to the method for operating the artificial intelligence device according to at least one embodiment of various embodiments of the present disclosure, the information of the speaker may include at least one or more of account or login information, profile information, payment and subscription information, paid or free service or application information capable of being linked, external device information capable of being connected, and routine information.

According to the method for operating the artificial intelligence device according to at least one embodiment of various embodiments of the present disclosure, the mapping and registering of the first wake-up word through the speaker and the voice recognition agent may include generating and storing macro information so that at least one commands is automatically executed with respect to the first wake-up word.

According to the method for operating the artificial intelligence device according to at least one embodiment of various embodiments of the present disclosure, the method may further include: receiving a user input; determining whether the registered first wake-up word is contained in the user input; and extracting a command other than the first wake-up word from the user input to compare the extracted command with the macro information when the first wake-up word is contained in the user input.

According to the method for operating the artificial intelligence device according to at least one embodiment of various embodiments of the present disclosure, the method may further include: determining whether the command is received within a predetermined time when the received user input includes the first wake-up word; and performing an operation related to a first function corresponding to the command when the command is received within the predetermined time and performing an operation related to a second function when the command is not received within the predetermined time, wherein the second function may be performed according to a second command with respect to any one of first commands registered in the macro of the first wake-up word.

An artificial intelligence voice service system according to at least one embodiment of various embodiments of the present disclosure includes: a server; and an artificial intelligence device that transmits/receives data with the server, wherein the artificial intelligence device includes: a processor configured to provide a voice recognition agent, receive a first wake-up word through the voice recognition agent so as to register the received first wake-up word, and transmit the first wake-up word to a server, wherein the first wake-up word is not a second wake-up word embedded in the artificial intelligence device.

The additional scope of the applicability of the present invention will become apparent from the detailed description below. However, the various changes and modifications within the spirit and scope of the present invention may be clearly understood by those skilled in the art, and thus, specific embodiments such as the detailed description and the preferred embodiments of the present invention should be understood as given as examples.

Advantageous Effects

According to at least one of various embodiments of the present disclosure, the wake-up word defined by the user may be registered and used as the desired wake-up word according to the personalities of the various users using the artificial intelligence device to perform the service so that the various functions of the artificial intelligence device are more easily and conveniently as the personalized device, thereby maximizing the satisfaction and convenience of using the artificial intelligence device.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 6A illustrates that the display 180 operates in a landscape mode in which the horizontal length is greater than the vertical length, and FIG. 6B illustrates that the display 180 operates in a portrait mode in which the vertical length is greater than the horizontal length.

FIG. 7 is a block diagram of an artificial intelligence device according to another embodiment of the present disclosure.

FIG. 11 is a view illustrating a method for registering a user-defined wake-up word in an artificial intelligence device according to an embodiment of the present disclosure.

FIGS. 16 to 23 are views illustrating a method for operating the artificial intelligence device according to use of the user-defined wake-up word list, which is registered according to an embodiment of the present disclosure.

FIGS. 24 and 25 are views illustrating a method for processing the user-defined wake-up word list in a server according to an embodiment of the present disclosure.

MODE FOR CARRYING OUT THE INVENTION

Figure 1:
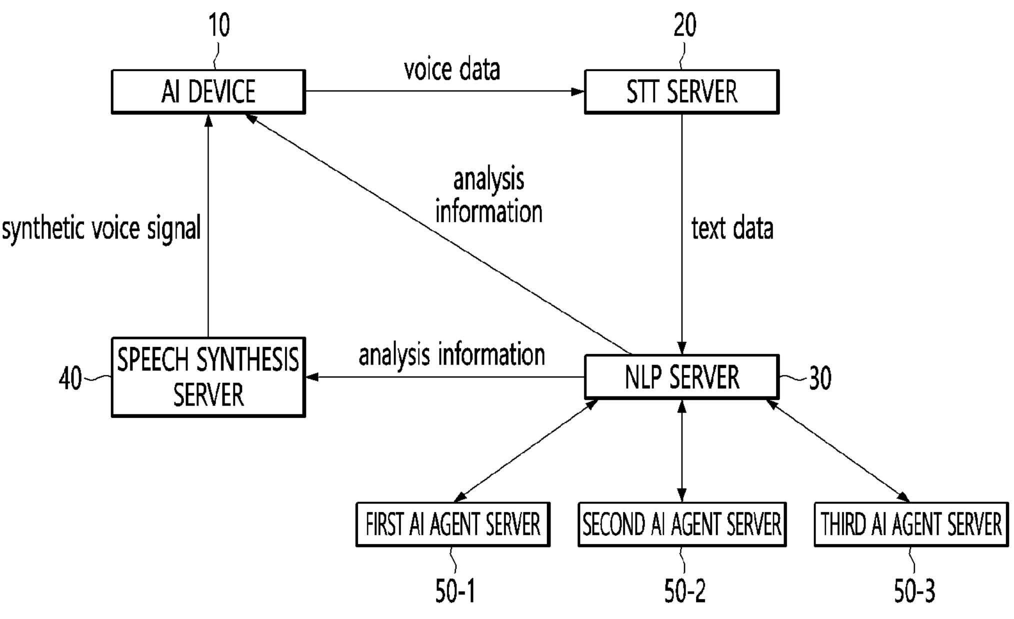
FIG. 1 is a view illustrating a speech system according to an embodiment of the present disclosure.

Hereinafter, embodiments are described in more detail with reference to accompanying drawings and regardless of the drawings symbols, same or similar components are assigned with the same reference numerals and thus repetitive for those are omitted. Since the suffixes "module" and "unit" for components used in the following description are given and interchanged for easiness in making the present disclosure, they do not have distinct meanings or functions. In the following description, detailed descriptions of well-known functions or constructions will be omitted because they would obscure the inventive concept in unnecessary detail. Also, the accompanying drawings are used to help easily understanding embodiments disclosed herein but the technical idea of the inventive concept is not limited thereto. It should be understood that all of variations, equivalents or substitutes contained in the concept and technical scope of the present disclosure are also included.

Although the terms including an ordinal number, such as "first" and "second", are used to describe various components, the components are not limited to the terms. The terms are used to distinguish between one component and another component.

It will be understood that when a component is referred to as being coupled with/to" or "connected to" another component, the component may be directly coupled with/to or connected to the another component or an intervening component may be present therebetween. Meanwhile, it will be understood that when a component is referred to as being directly coupled with/to" or "connected to" another component, an intervening component may be absent therebetween.

An artificial intelligence (AI) device illustrated according to the present disclosure may include a cellular phone, a smart phone, a laptop computer, a digital broadcasting AI device, a personal digital assistants (PDA), a portable multimedia player (PMP), a navigation system, a slate personal computer (PC), a table PC, an ultrabook, a wearable device (for example, a watch-type AI device (smartwatch), a glass-type AI device (a smart glass), or a head mounted display (HMD)).

However, an artificial intelligence device 10 may be applied to a stationary-type AI device such as a smart TV, a desktop computer, a digital signage, a refrigerator, a washing machine, an air conditioner, or a dish washer.

In addition, the AI device 10 may be applied even to a stationary robot or a movable robot.

In addition, the AI device 10 may perform the function of a speech agent. The speech agent may be a program for recognizing the voice of a user and for outputting a response suitable for the recognized voice of the user, in the form of a voice.

FIG. 1 is a view illustrating a speech system according to an embodiment of the present disclosure.

A typical process of recognizing and synthesizing a voice may include converting speaker voice data into text data, analyzing a speaker intention based on the converted text data, converting the text data corresponding to the analyzed intention into synthetic voice data, and outputting the converted synthetic voice data. As shown in FIG. 1, a speech recognition system 1 may be used for the process of recognizing and synthesizing a voice.

Referring to FIG. 1, the speech recognition system 1 may include the AI device 10, a Speech-To-Text (STT) server 20, a Natural Language Processing (NLP) server 30, a speech synthesis server 40, and a plurality of AI agent servers 50-1 to 50-3.

The AI device 10 may transmit, to the STT server 20, a voice signal corresponding to the voice of a speaker received through a micro-phone 122.

The STT server 20 may convert voice data received from the AI device 10 into text data.

The STT server 20 may increase the accuracy of voice-text conversion by using a language model.

A language model may refer to a model for calculating the probability of a sentence or the probability of a next word coming out when previous words are given.

For example, the language model may include probabilistic language models, such as a Unigram model, a Bigram model, or an N-gram model.

The Unigram model is a model formed on the assumption that all words are completely independently utilized, and obtained by calculating the probability of a row of words by the probability of each word.

The Bigram model is a model formed on the assumption that a word is utilized dependently on one previous word.

The N-gram model is a model formed on the assumption that a word is utilized dependently on $(n-1)$ number of previous words.

In other words, the STT server 20 may determine whether the text data is appropriately converted from the voice data, based on the language model. Accordingly, the accuracy of the conversion to the text data may be enhanced.

The NLP server 30 may receive the text data from the STT server 20. The STT server 20 may be included in the NLP server 30.

The NLP server 30 may analyze text data intention, based on the received text data.

The NLP server 30 may transmit intention analysis information indicating a result obtained by analyzing the text data intention, to the AI device 10.

For another example, the NLP server 30 may transmit the intention analysis information to the speech synthesis server 40. The speech synthesis server 40 may generate a synthetic voice based on the intention analysis information, and may transmit the generated synthetic voice to the AI device 10.

The NLP server 30 may generate the intention analysis information by sequentially performing the steps of analyzing a morpheme, of parsing, of analyzing a speech-act, and of processing a conversation, with respect to the text data.

The step of analyzing the morpheme is to classify text data corresponding to a voice uttered by a user into morpheme units, which are the smallest units of meaning, and to determine the word class of the classified morpheme.

The step of the parsing is to divide the text data into noun phrases, verb phrases, and adjective phrases by using the result from the step of analyzing the morpheme and to determine the relationship between the divided phrases.

The subjects, the objects, and the modifiers of the voice uttered by the user may be determined through the step of the parsing.

The step of analyzing the speech-act is to analyze the intention of the voice uttered by the user using the result from the step of the parsing. Specifically, the step of analyzing the speech-act is to determine the intention of a sentence, for example, whether the user is asking a question, requesting, or expressing a simple emotion.

The step of processing the conversation is to determine whether to make an answer to the speech of the user, make a response to the speech of the user, and ask a question for additional information, by using the result from the step of analyzing the speech-act.

After the step of processing the conversation, the NLP server 30 may generate intention analysis information including at least one of an answer to an intention uttered by the user, a response to the intention uttered by the user, or an additional information inquiry for an intention uttered by the user.

The NLP server 30 may transmit a retrieving request to a retrieving server (not shown) and may receive retrieving information corresponding to the retrieving request, to retrieve information corresponding to the intention uttered by the user.

When the intention uttered by the user is present in retrieving content, the retrieving information may include information on the content to be retrieved.

The NLP server 30 may transmit retrieving information to the AI device 10, and the AI device 10 may output the retrieving information.

Meanwhile, the NLP server 30 may receive text data from the AI device 10. For example, when the AI device 10 supports a voice text conversion function, the AI device 10 may convert the voice data into text data, and transmit the converted text data to the NLP server 30.

The speech synthesis server 40 may generate a synthetic voice by combining voice data which is previously stored.

The speech synthesis server 40 may record a voice of one person selected as a model and divide the recorded voice in the unit of a syllable or a word.

The speech synthesis server 40 may store the voice divided in the unit of a syllable or a word into an internal database or an external database.

The speech synthesis server 40 may retrieve, from the database, a syllable or a word corresponding to the given text data, may synthesize the combination of the retrieved syllables or words, and may generate a synthetic voice.

The speech synthesis server 40 may store a plurality of voice language groups corresponding to each of a plurality of languages.

For example, the speech synthesis server 40 may include a first voice language group recorded in Korean and a second voice language group recorded in English.

The speech synthesis server 40 may translate text data in the first language into a text in the second language and generate a synthetic voice corresponding to the translated text in the second language, by using a second voice language group.

The speech synthesis server 40 may transmit the generated synthetic voice to the AI device 10.

The speech synthesis server 40 may receive analysis information from the NLP server 30. The analysis information may include information obtained by analyzing the intention of the voice uttered by the user.

The speech synthesis server 40 may generate a synthetic voice in which a user intention is reflected, based on the analysis information.

According to an embodiment, the STT server 20, the NLP server 30, and the speech synthesis server 40 may be implemented in the form of one server.

The functions of each of the STT server 20, the NLP server 30, and the speech synthesis server 40 described above may be performed in the AI device 10. To this end, the AI device 10 may include at least one processor.

Each of a plurality of AI agent servers 50-1 to 50-3 may transmit the retrieving information to the NLP server 30 or the AI device 10 in response to a request by the NLP server 30.

When intention analysis result of the NLP server 30 corresponds to a request (content retrieving request) for retrieving content, the NLP server 30 may transmit the content retrieving request to at least one of a plurality of AI agent servers 50-1 to 50-3, and may receive a result (the retrieving result of content) obtained by retrieving content, from the corresponding server. The NLP server 30 may transmit the received retrieving result to the AI device 10.

Figure 2:
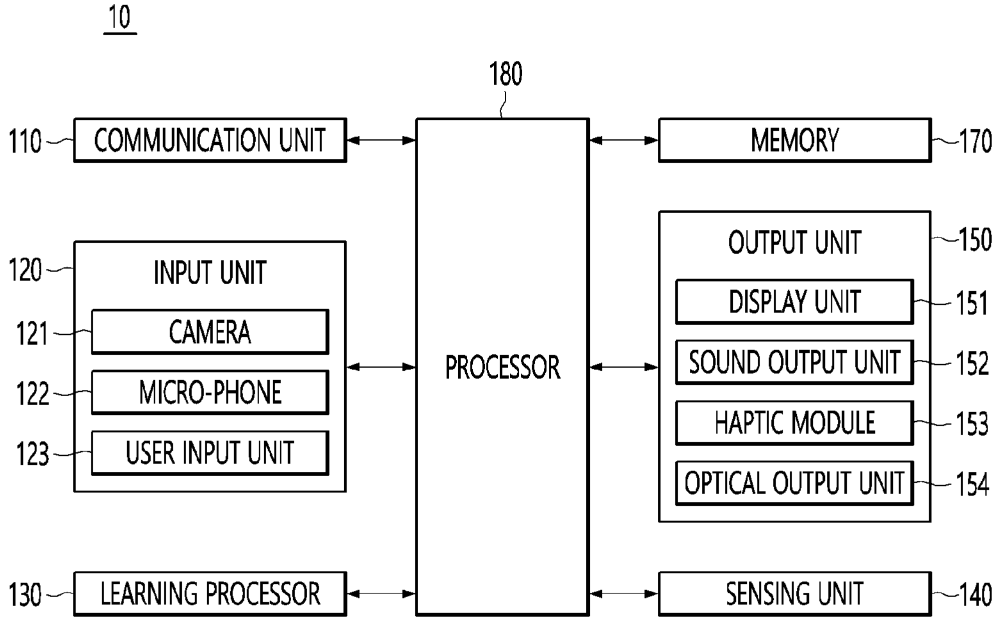
FIG. 2 is a block diagram illustrating a configuration of an AI device according to an embodiment of the present disclosure.

FIG. 2 is a block diagram illustrating a configuration of an AI device 10 according to an embodiment of the present disclosure.

Referring to FIG. 2, the AI device 10 may include a communication unit 110, an input unit 120, a learning processor 130, a sensing unit 140, an output unit 150, a memory 170, and a processor 180.

The communication unit 110 may transmit and receive data to and from external devices through wired and wireless communication technologies. For example, the communication unit 110 may transmit and receive sensor information, a user input, a learning model, and a control signal to and from external devices.

In this case, communication technologies used by the communication unit 110 include Global System for Mobile Communication (GSM), Code Division Multi Access (CDMA), Long Term Evolution (LTE), 5G (Generation), Wireless LAN (WLAN), Wireless-Fidelity (Wi-Fi), Bluetooth™, RFID (NFC), Infrared Data Association (IrDA), ZigBee, and Near Field Communication (NFC).

The input unit 120 may acquire various types of data.

The input unit 120 may include a camera to input a video signal, a microphone to receive an audio signal, or a user input unit to receive information from a user. In this case, when the camera or the microphone is treated as a sensor, the signal obtained from the camera or the microphone may be referred to as sensing data or sensor information.

The input unit 120 may acquire input data to be used when acquiring an output by using learning data and a learning model for training a model. The input unit 120 may acquire unprocessed input data. In this case, the processor 180 or the learning processor 130 may extract an input feature for pre-processing for the input data.

The input unit 120 may include a camera 121 to input a video signal, a micro-phone 122 to receive an audio signal, and a user input unit 123 to receive information from a user.

Voice data or image data collected by the input unit 120 may be analyzed and processed using a control command of the user.

The input unit 120, which inputs image information (or a signal), audio information (or a signal), data, or information input from a user, may include one camera or a plurality of cameras 121 to input image information, in the AI device 10.

The camera 121 may process an image frame, such as a still image or a moving picture image, which is obtained by an image sensor in a video call mode or a photographing mode. The processed image frame may be displayed on the display unit 151 or stored in the memory 170.

The micro-phone 122 processes an external sound signal as electrical voice data. The processed voice data may be variously utilized based on a function (or an application program which is executed) being performed by the AI device 10. Meanwhile, various noise cancellation algorithms may be applied to the microphone 122 to remove noise caused in a process of receiving an external sound signal.

The user input unit 123 receives information from the user. When information is input through the user input unit 123, the processor 180 may control the operation of the AI device 10 to correspond to the input information.

The user input unit 123 may include a mechanical input unit (or a mechanical key, for example, a button positioned at a front/rear surface or a side surface of the terminal 100, a dome switch, a jog wheel, or a jog switch), and a touch-type input unit. For example, the touch-type input unit may include a virtual key, a soft key, or a visual key displayed on the touch screen through software processing, or a touch key disposed in a part other than the touch screen.

The learning processor 130 may train a model formed based on an artificial neural network by using learning data. The trained artificial neural network may be referred to as a learning model. The learning model may be used to infer a result value for new input data, rather than learning data, and the inferred values may be used as a basis for the determination to perform any action.

The learning processor 130 may include a memory integrated with or implemented in the AI device 10. Alternatively, the learning processor 130 may be implemented using an external memory directly connected to the memory 170 and the AI device or a memory retained in an external device.

The sensing unit 140 may acquire at least one of internal information of the AI device 10, surrounding environment information of the AI device 10, or user information of the AI device 10, by using various sensors.

In this case, sensors included in the sensing unit 140 include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a Lidar or a radar.

The output unit 150 may generate an output related to vision, hearing, or touch.

The output unit 150 may include at least one of a display unit 151, a sound output unit 152, a haptic module 153, or an optical output unit 154.

The display unit 151 displays (or outputs) information processed by the AI device 10. For example, the display unit 151 may display execution screen information of an application program driven by the AI device 10, or a User interface (UI) and graphical User Interface (GUI) information based on the execution screen information.

As the display unit 151 forms a mutual layer structure together with a touch sensor or is integrally formed with the touch sensor, the touch screen may be implemented. The touch screen may function as the user input unit 123 providing an input interface between the AI device 10 and the user, and may provide an output interface between a terminal 100 and the user.

The sound output unit 152 may output audio data received from the communication unit 110 or stored in the memory 170 in a call signal reception mode, a call mode, a recording mode, a voice recognition mode, and a broadcast receiving mode.

The sound output unit 152 may include at least one of a receiver, a speaker, or a buzzer. The haptic module 153 generates various tactile effects which the user may feel. A representative tactile effect generated by the haptic module 153 may be vibration.

The light outputting unit 154 outputs a signal for notifying that an event occurs, by using light from a light source of the AI device 10. Events occurring in the AI device 10 may include message reception, call signal reception, a missed call, an alarm, schedule notification, email reception, and reception of information through an application.

The memory 170 may store data for supporting various functions of the AI device 10. For example, the memory 170 may store input data, learning data, a learning model, and a learning history acquired by the input unit 120.

The processor 180 may determine at least one executable operation of the AI device 10, based on information determined or generated using a data analysis algorithm or a machine learning algorithm. In addition, the processor 180 may perform an operation determined by controlling components of the AI device 10.

The processor 180 may request, retrieve, receive, or utilize data of the learning processor 130 or data stored in the memory 170, and may control components of the AI device 10 to execute a predicted operation or an operation, which is determined as preferred, of the at least one executable operation.

When the connection of the external device is required to perform the determined operation, the processor 180 may generate a control signal for controlling the relevant external device and transmit the generated control signal to the relevant external device.

The processor 180 may acquire intention information from the user input and determine a request of the user, based on the acquired intention information.

The processor 180 may acquire intention information corresponding to the user input by using at least one of an STT engine to convert a voice input into a character string or an NLP engine to acquire intention information of a natural language.

At least one of the STT engine or the NLP engine may at least partially include an artificial neural network trained based on a machine learning algorithm. In addition, at least one of the STT engine and the NLP engine may be trained by the learning processor 130, by the learning processor 240 of the AI server 200, or by distributed processing into the learning processor 130 and the learning processor 240.

The processor 180 may collect history information including the details of an operation of the AI device 10 or a user feedback on the operation, store the collected history information in the memory 170 or the learning processor 130, or transmit the collected history information to an external device such as the AI server 200. The collected history information may be used to update the learning model.

The processor 180 may control at least some of the components of the AI device 10 to run an application program stored in the memory 170. Furthermore, the processor 180 may combine at least two of the components, which are included in the AI device 10, and operate the combined components, to run the application program.

Figure 3:
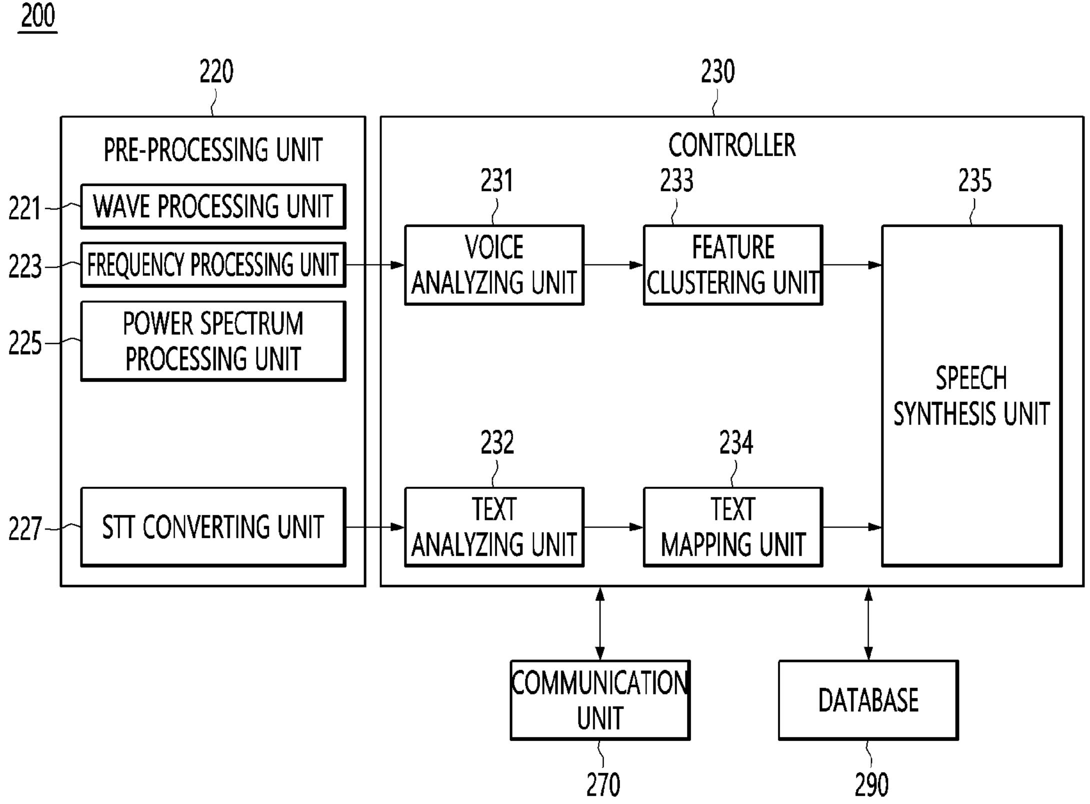
FIG. 3 is a block diagram illustrating the configuration of a voice service server according to an embodiment of the present disclosure.

FIG. 3 is a block diagram illustrating the configuration of a voice service server according to an embodiment of the present disclosure.

The speech service server 200 may include at least one of the STT server 20, the NLP server 30, or the speech synthesis server 40 illustrated in FIG. 1. The speech service server 200 may be referred to as a server system.

Referring to FIG. 3, the speech service server 200 may include a pre-processing unit 220, a controller 230, a communication unit 270, and a database 290.

The pre-processing unit 220 may pre-process the voice received through the communication unit 270 or the voice stored in the database 290.

The pre-processing unit 220 may be implemented as a chip separate from the controller 230, or as a chip included in the controller 230.

The pre-processing unit 220 may receive a voice signal (which the user utters) and filter out a noise signal from the voice signal, before converting the received voice signal into text data.

When the pre-processing unit 220 is provided in the AI device 10, the pre-processing unit 220 may recognize a wake-up word for activating voice recognition of the AI device 10. The pre-processing unit 220 may convert the wake-up word received through the micro-phone 121 into text data. When the converted text data is text data corresponding to the wake-up word previously stored, the pre-processing unit 220 may make a determination that the wake-up word is recognized.

The pre-processing unit 220 may convert the noise-removed voice signal into a power spectrum.

The power spectrum may be a parameter indicating the type of a frequency component and the size of a frequency included in a waveform of a voice signal temporarily fluctuating The power spectrum shows the distribution of amplitude square values as a function of the frequency in the waveform of the voice signal. The details thereof be described with reference to FIG. 4 later.

Figure 4:
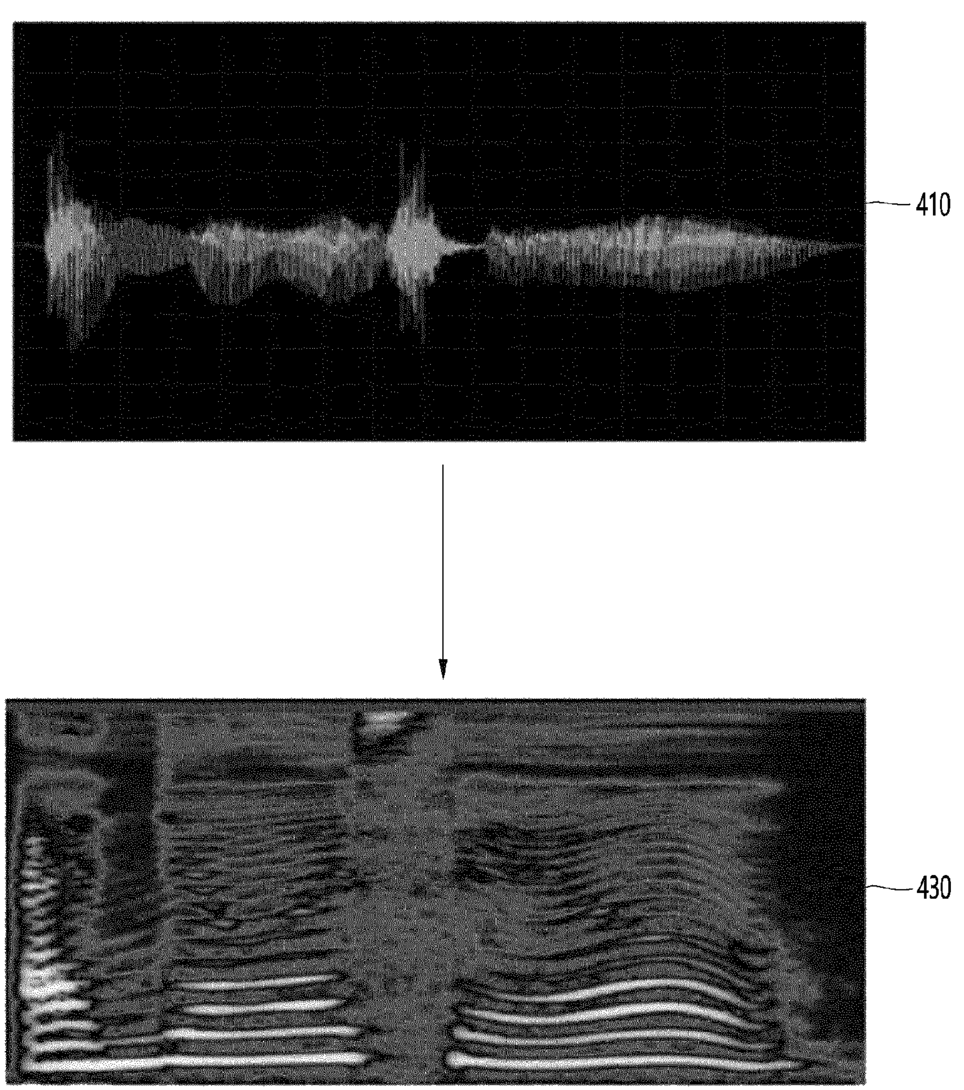
FIG. 4 is a view illustrating that a voice signal is converted into a power spectrum according to an embodiment of the present disclosure.

FIG. 4 is a view illustrating that a voice signal is converted into a power spectrum according to an embodiment of the present disclosure.

Referring to FIG. 4, a voice signal 410 is illustrated. The voice signal 210 may be a signal received from an external device or previously stored in the memory 170.

An x-axis of the voice signal 410 may indicate time, and the y-axis may indicate the magnitude of the amplitude.

The power spectrum processing unit 225 may convert the voice signal 310 having an x-axis as a time axis into a power spectrum 430 having an x-axis as a frequency axis.

The power spectrum processing unit 225 may convert the voice signal 310 into the power spectrum 430 by using fast Fourier Transform (FFT).

The x-axis and the y-axis of the power spectrum 430 represent a frequency, and a square value of the amplitude.

FIG. 3 will be described again.

The functions of the pre-processing unit 220 and the controller 230 described in FIG. 3 may be performed in the NLP server 30.

The pre-processing unit 220 may include a wave processing unit 221, a frequency processing unit 223, a power spectrum processing unit 225, and a STT converting unit 227.

The wave processing unit 221 may extract a waveform from a voice.

The frequency processing unit 223 may extract a frequency band from the voice.

The power spectrum processing unit 225 may extract a power spectrum from the voice.

The power spectrum may be a parameter indicating a frequency component and the size of the frequency component included in a waveform temporarily fluctuating, when the waveform temporarily fluctuating is provided.

The STT converting unit 227 may convert a voice into a text.

The STT converting unit 227 may convert a voice made in a specific language into a text made in a relevant language.

The controller 230 may control the overall operation of the speech service server 200.

The controller 230 may include a voice analyzing unit 231, a text analyzing unit 232, a feature clustering unit 233, a text mapping unit 234, and a speech synthesis unit 235.

The voice analyzing unit 231 may extract characteristic information of a voice by using at least one of a voice waveform, a voice frequency band, or a voice power spectrum which is pre-processed by the pre-processing unit 220.

The characteristic information of the voice may include at least one of information on the gender of a speaker, a voice (or tone) of the speaker, a sound pitch, the intonation of the speaker, a speech rate of the speaker, or the emotion of the speaker.

In addition, the characteristic information of the voice may further include the tone of the speaker.

The text analyzing unit 232 may extract a main expression phrase from the text converted by the STT converting unit 227.

When detecting that the tone is changed between phrases, from the converted text, the text analyzing unit 232 may extract the phrase having the different tone as the main expression phrase.

When a frequency band is changed to a preset band or more between the phrases, the text analyzing unit 232 may determine that the tone is changed.

The text analyzing unit 232 may extract a main word from the phrase of the converted text. The main word may be a noun which exists in a phrase, but the noun is provided only for the illustrative purpose.

The feature clustering unit 233 may classify a speech type of the speaker using the characteristic information of the voice extracted by the voice analyzing unit 231.

The feature clustering unit 233 may classify the speech type of the speaker, by placing a weight to each of type items constituting the characteristic information of the voice.

The feature clustering unit 233 may classify the speech type of the speaker, using an attention technique of the deep learning model.

The text mapping unit 234 may translate the text converted in the first language into the text in the second language.

The text mapping unit 234 may map the text translated in the second language to the text in the first language.

The text mapping unit 234 may map the main expression phrase constituting the text in the first language to the phrase of the second language corresponding to the main expression phrase.

The text mapping unit 234 may map the speech type corresponding to the main expression phrase constituting the text in the first language to the phrase in the second language. This is to apply the speech type, which is classified, to the phrase in the second language.

The speech synthesis unit 235 may generate the synthetic voice by applying the speech type, which is classified in the feature clustering unit 233, and the tone of the speaker to the main expression phrase of the text translated in the second language by the text mapping unit 234.

The controller 230 may determine a speech feature of the user by using at least one of the transmitted text data or the power spectrum 330.

The speech feature of the user may include the gender of a user, the pitch of a sound of the user, the sound tone of the user, the topic uttered by the user, the speech rate of the user, and the voice volume of the user.

The controller 230 may obtain a frequency of the voice signal 310 and an amplitude corresponding to the frequency using the power spectrum 330.

The controller 230 may determine the gender of the user who utters the voice, by using the frequency band of the power spectrum 230.

For example, when the frequency band of the power spectrum 330 is within a preset first frequency band range, the controller 230 may determine the gender of the user as a male.

When the frequency band of the power spectrum 330 is within a preset second frequency band range, the controller 230 may determine the gender of the user as a female. In this case, the second frequency band range may be greater than the first frequency band range.

The controller 230 may determine the pitch of the voice, by using the frequency band of the power spectrum 330.

For example, the controller 230 may determine the pitch of a sound, based on the magnitude of the amplitude, within a specific frequency band range.

The controller 230 may determine the tone of the user by using the frequency band of the power spectrum 330. For example, the controller 230 may determine, as a main sound band of a user, a frequency band having at least a specific magnitude in an amplitude, and may determine the determined main sound band as a tone of the user.

The controller 230 may determine the speech rate of the user based on the number of syllables uttered per unit time, which are included in the converted text data.

The controller 230 may determine the uttered topic by the user through a Bag-Of-Word Model technique, with respect to the converted text data.

The Bag-Of-Word Model technique is to extract mainly used words based on the frequency of words in sentences. Specifically, the Bag-Of-Word Model technique is to extract unique words within a sentence and to express the frequency of each extracted word as a vector to determine the feature of the uttered topic.

For example, when words such as "running" and "physical strength" frequently appear in the text data, the controller 230 may classify, as exercise, the uttered topic by the user.

The controller 230 may determine the uttered topic by the user from text data using a text categorization technique which is well known. The controller 230 may extract a keyword from the text data to determine the uttered topic by the user.

The controller 230 may determine the voice volume of the user voice, based on amplitude information in the entire frequency band.

For example, the controller 230 may determine the voice volume of the user, based on an amplitude average or a weight average in each frequency band of the power spectrum.

The communication unit 270 may make wired or wireless communication with an external server.

The database 290 may store a voice in a first language, which is included in the content.

The database 290 may store a synthetic voice formed by converting the voice in the first language into the voice in the second language.

The database 290 may store a first text corresponding to the voice in the first language and a second text obtained as the first text is translated into a text in the second language.

The database 290 may store various learning models necessary for speech recognition.

Meanwhile, the processor 180 of the AI device 10 illustrated in FIG. 2 may include the pre-processing unit 220 and the controller 230 illustrated in FIG. 3.

In other words, the processor 180 of the AI device 10 may perform a function of the pre-processing unit 220 and a function of the controller 230.

Figure 5:
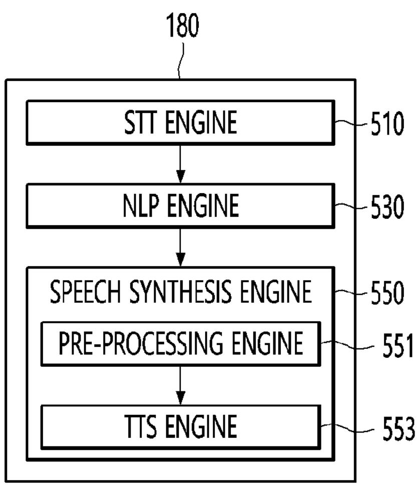
FIG. 5 is a block diagram illustrating a configuration of a processor for recognizing and synthesizing a voice in an AI device according to an embodiment of the present disclosure.

FIG. 5 is a block diagram illustrating a configuration of a processor for recognizing and synthesizing a voice in an AI device according to an embodiment of the present disclosure.

In other words, the processor for recognizing and synthesizing a voice in FIG. 5 may be performed by the learning processor 130 or the processor 180 of the AI device 10, without performed by a server.

Referring to FIG. 5, the processor 180 of the AI device 10 may include an STT engine 510, an NLP engine 530, and a speech synthesis engine 550.

Each engine may be either hardware or software.

The STT engine 510 may perform a function of the STT server 20 of FIG. 1. In other words, the STT engine 510 may convert the voice data into text data.

The NLP engine 530 may perform a function of the NLP server 30 of FIG. 1. In other words, the NLP engine 530 may acquire intention analysis information, which indicates the intention of the speaker, from the converted text data.

The speech synthesis engine 550 may perform the function of the speech synthesis server 40 of FIG. 1.

The speech synthesis engine 550 may retrieve, from the database, syllables or words corresponding to the provided text data, and synthesize the combination of the retrieved syllables or words to generate a synthetic voice.

The speech synthesis engine 550 may include a pre-processing engine 551 and a Text-To-Speech (TTS) engine 553.

The pre-processing engine 551 may pre-process text data before generating the synthetic voice.

Specifically, the pre-processing engine 551 performs tokenization by dividing text data into tokens which are meaningful units.

After the tokenization is performed, the pre-processing engine 551 may perform a cleansing operation of removing unnecessary characters and symbols such that noise is removed.

Thereafter, the pre-processing engine 551 may generate the same word token by integrating word tokens having different expression manners.

Thereafter, the pre-processing engine 551 may remove a meaningless word token (informal word; stopword).

The TTS engine 453 may synthesize a voice corresponding to the preprocessed text data and generate the synthetic voice.

FIGS. 6A and 6B are diagrams for illustrating a horizontal mode and a vertical mode of a stand-type display device according to an embodiment of the present disclosure.

Referring to FIGS. 6A and 6B, a stand-type display device 100 is illustrated.

A shaft 103 and a stand base 105 may be connected to the display device 100.

The shaft 103 may connect the display device 100 and the stand base 105 to each other. The shaft 103 may extend vertically.

The lower end of the shaft 103 may be connected to the edges of the stand base 105.

The lower end of the shaft 103 may be rotatably connected to the edges of the stand base 105.

The display device 100 and the shaft 103 may rotate about a vertical axis with respect to the stand base 105.

An upper portion of the shaft 103 may be connected to the rear surface of the display device 100.

The stand base 105 may serve to support the display device 100.

The display device 100 may be configured to include the shaft 103 and the stand base 105.

The display device 100 may rotate around a point where the upper portion of the shaft 103 and the rear surface of the display 180 contact each other.

FIG. 6A illustrates that the display 180 operates in a landscape mode in which the horizontal length is greater than the vertical length, and FIG. 6B illustrates that the display 180 operates in a portrait mode in which the vertical length is greater than the horizontal length.

A user may move while holding a stand-type display device. That is, the stand-type display device has improved mobility, unlike a fixed device, so that a user is not limited by an arrangement position.

A voice recognition processing method according to reception of wake-up words from a voice service system or artificial intelligence device 10 is described.

Hereinafter, for convenience of description, a voice recognition processing method in relation to a wake-up word in the artificial intelligence device 10 will be described as an embodiment. In this regard, the STT engine 510, the NLP engine 530, and the like in the artificial intelligence device 10 as shown in FIG. 5 may perform an operation for voice recognition processing according to a wake-up word.

The roles of the STT engine 510 and the NLP engine 530 in the artificial intelligence device 10 as shown in FIG. 5 are the STT server 20 and the NLP server 40 in the voice service system shown in FIG. 1 can be replaced. The server of FIG. 1 and the engine of FIG. 5 may be combined each other to perform the voice recognition processing method.

The wake-up word described in the present disclosure can be divided into a basic (or default) wake-up word and a user-defined wake-up word.

The "basic wake-up word" may indicate a wake-up word embedded by a manufacturer of the artificial intelligence device 10 (or the voice service server 200). Unlike the user-defined wake-up word, the basic wake-up word may indicate a remote wake-up word that anyone can use for the artificial intelligence device 10 regardless of conditions. As such a basic wake-up word, 'Hi LG' can be taken as an example. However, it is not limited thereto.

On the other hand, "user-defined wake-up word" may represent a wake-up word arbitrarily defined by a user as the wake-up word, unlike the aforementioned basic wake-up word. It might be preferable that the user-defined wake-up word be registered in advance in at least one of the artificial intelligence device 10 and the voice service server 200 prior to use. In order to distinguish and prevent confusion with the basic wake-up word, it might be preferable that the user-defined wake-up word is selected so that morphemes, word or words, phrase, clause, sentence, etc. do not overlap with the basic wake-up word. Unlike the basic wake-up word, the user-defined wake-up word may be customized so that the artificial intelligence device 10 may be configured to be functioned just for a specific user. Therefore, the user can have a personalized artificial intelligence device 10 through a user-defined wake-up word.

Hereinafter, a method for providing a personalized service in the artificial intelligence device 10 based on a user-defined wake-up word, not a basic wake-up word, will be described. However, the present disclosure is not limited thereto, and a basic wake-up word may be used together with a user-defined wake-up word according to a usage scenario.

The user-defined wake-up word may functionally replace the basic wake-up word.

In addition, the user-defined wake-up word, unlike the basic wake-up word, can be automatically linked with various information including personal information of the user registered in the artificial intelligence device 10, as well as macro functions for commands can also be used. However, the present disclosure is not necessarily limited thereto, and the above-described interlocking and macro functions may be applied to a basic wake-up word.

FIG. 7 is a block diagram of an artificial intelligence device 10 according to another embodiment of the present disclosure.

Referring to FIG. 7, the artificial intelligence device 10 may include a communication unit (not shown), a display 150 or 151 and a processing part 700 to process a wake-up word defined by a user (hereinafter, referred to as a user-defined wake-up word).

The communication unit may be configured to support communication between the artificial intelligence device 10 and a voice service server 200.

The display 150 or 151 may be configured to output a user interface or OSD message and information according to the processing and provide a function execution/performing screen, in relation to processing (e.g., registration, use, etc.) of the user-defined wake-up word.

The processing part 700 may include a memory 710 and a processor 720.

The processing part 700 may be connected to the voice service server 200 to transmit/receive data.

The memory 710 may be configured to store various data in addition to data received or processed by the processing part 700.

The memory 710 may be configured to store NLP result information processed by the processor 720 or received from the voice service server 200.

The memory 710 may be configured to store various information including personal information of each user registered in the artificial intelligence device 10, the user-defined wake-up word of each user, macro function information, and the like.

The processor 720 may be configured to generate link information (or mapping information) between the personal information of each user stored in the memory 710 and the user-defined wake-up word.

The processor 720 may be configured to generate link information (or mapping information) between the user-defined wake-up word stored in the memory 710 and the macro function information.

The processor 720 may be configured to generate link information (or mapping information) between the personal information, the macro information, and the user-defined wake-up word of each user stored in the memory 710.

The aforementioned link information may not be necessarily generated for the user-defined wake-up word, but may also be generated for a basic wake-up word.

The processor 720 may be configured to control the display 150 or 151 to provide various information (or recommended information), functions (or recommended functions), services (or recommended services), and the like to the user, based on the link information (or user-defined wake-up word).

As described above, the voice service server 200 may include the STT server 20 and the NLP server 30 illustrated in FIG. 1 and may also include the voice synthesis server 40.

A process of processing voice recognition/voice synthesis between the artificial intelligence device 10 and the voice service server 200 will be described with reference to contents disclosed in FIGS. 1 to 5, and duplicated descriptions thereof will be omitted.

The processor 720 may have the same configuration as the processor 180 of FIG. 2, but may also be provided as a separate configuration.

In this disclosure, even if it is described as the artificial intelligence device 10 for convenience of explanation, it may be replaced with or included in the voice service server 200 depending on the context.

Figure 8:
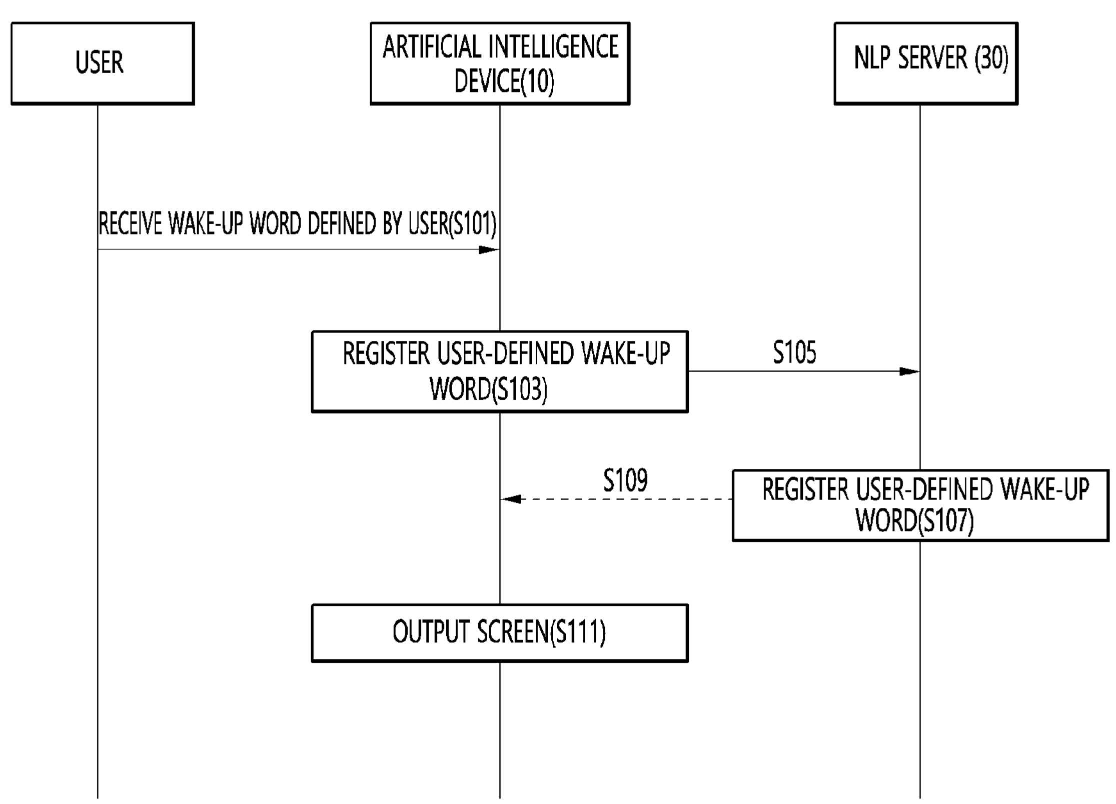
FIG. 8 is a view illustrating a method for registering a user-defined wake-up word in a voice service system according to an embodiment of the present disclosure.

FIG. 8 is a view illustrating a process of registering the user-defined wake-up word in the artificial intelligence device 10.

In FIG. 8, for convenience of explanation, a process, in which the user-defined wake-up word is pre-registered in the artificial intelligence device 10 and then is transmitted to the NLP server 30 so as to be registered or stored in the NLP server 30, is described as an embodiment. However, it is not necessarily limited thereto. For example, the user-defined wake-up word may be transmitted to the NLP server 30 through the artificial intelligence device 10 and be pre-registered in the NLP server 30, and then, the artificial intelligence device 10 may be operated according to a control of the NLP server 30. Here, the artificial intelligence device 10 may or may not separately post-register the user-defined wake-up word.

The artificial intelligence device 10 may be configured to receive (or acquire) a unique user-defined wake-up word from the user (S101).

The artificial intelligence device 10 may be configured to register the user-defined wake-up word received through operation S101 (S103).

The artificial intelligence device 10 may be configured to transmit the user-defined wake-up word registered through operation S103 to the NLP server 30 (S105).

The NLP server 30 may be configured to register the user-defined wake-up word received from the artificial intelligence device 10 through operation S105 (S107).

The NLP server 30 may be configured to return (or report) to the artificial intelligence device 10 to notify that the user-defined wake-up word received from the artificial intelligence device 10 in operation S107 is registered (S109).

The artificial intelligence device 10 may be configured to provide a screen according to the user-defined wake-up word (S111).

FIG. 11 is a view illustrating a method for registering the user-defined wake-up word in the artificial intelligence device 10.

A procedure for registering the user-defined wake-up word in operation S101 may be initiated according to a predetermined button input through a remote control device (not shown). Here, the remote control device may include at least one of an AI speaker, a smartphone, a tablet PC, a wearable device, or the like. The remote control device may be a device on which firmware/software such as an application, program, an application programming interface (API), etc., which are necessary for data communication such as voice input with the artificial intelligence device 10, is installed. In addition, the remote control device may indicate a device that is previously registered in the artificial intelligence device 10.

Even though a user interface for registration of a separate user-defined wake-up word is provided through the above-described remote control device, or a procedure for the registration is not initiated, when the user-defined wake-up word in operation S101 is repeatedly input with the same voice input more than a predefined number of times, the artificial intelligence device 10 may be configured to register the user-defined wake-up word or initiate the procedure for registering the user-defined wake-up word as in operation S103. Here, if the same voice input (e.g., 'user-defined wake-up word, user-defined wake-up word, . . . , user-defined wake-up word') may be effectively processed by the artificial intelligence device 10 after utterance of only the basic wake-up word (e.g., 'Hi LG') or together with the basic wake-up word (for example, 'Hi LG, user-defined wake-up word registration', 'Hi LG wake-up word registration', etc.).

FIG. 11(*a*) illustrates an example of the user interface provided by the artificial intelligence device 10 for setting voice recognition. When an item of registering a user call word (as a wake-up word) is selected, the artificial intelligence device 10 may be configured to register a desired voice recognition call word, that is, a user-defined wake-up word.

Figure 13:
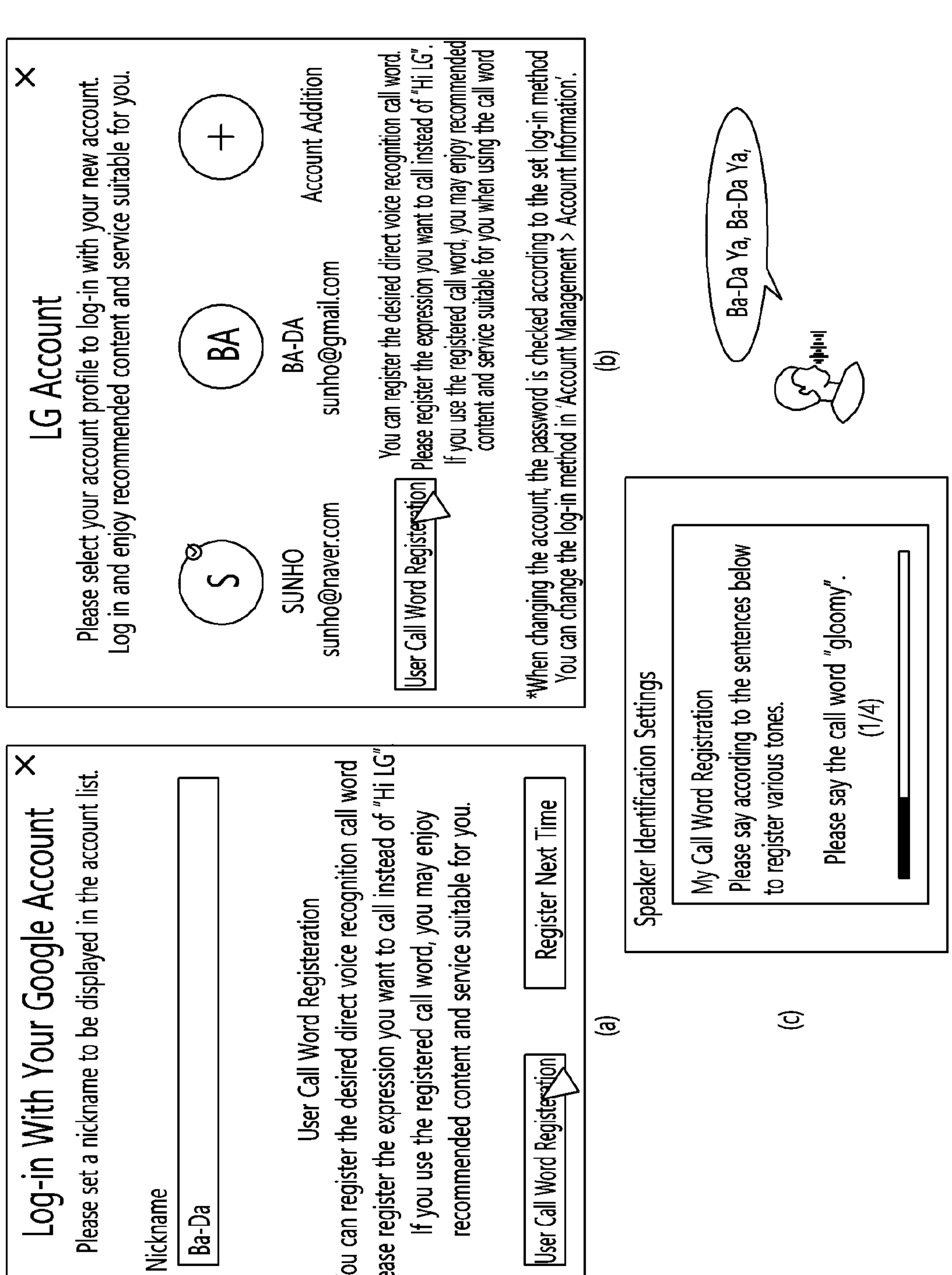

FIGS. 11(*b*) to 11(*e*) relate to a procedure for registering the call word, that is, the user-defined wake-up word. When the call word is used, the artificial intelligence device 10 may be configured to request a voice input according to various emotional states with respect to the call word of the user. In FIGS. 13(*b*) to 13(*e*), the call words may be induced to be uttered affectionately, bluntly, angrily, and melancholy, respectively. However, the embodiment is not limited thereto, and the artificial intelligence device 10 may induce utterance about other emotional states or nuances of the speaker. In FIGS. 11(*b*) to 11(*e*), the artificial intelligence device 10 may be configured to provide a registered state of each call word in the form of a numeral and bar so that a state of a definition registration procedure of the user is easily recognized.

When the registration procedure is completed, the artificial intelligence device 10 may be configured to output the registered user-defined wake-up word to perform a service so that procedures such as modification or re-registration of the user are performed. When the registration of the user-defined wake-up word requested by the user is completed, the artificial intelligence device 10 may be configured to request utterance of the user-defined wake-up word with a registration completion message and provide a voice agent when uttered to perform a verification procedure for the registered user-defined wake-up word. The corresponding procedure may be performed under the request of the server 200 or under the control of the server 200 after the registration in the server 200.

The user-defined wake-up word may be mapped to related user information and the like. This may be done at the time of the registration of the user-defined wake-up word or after the registration.

Figure 12:
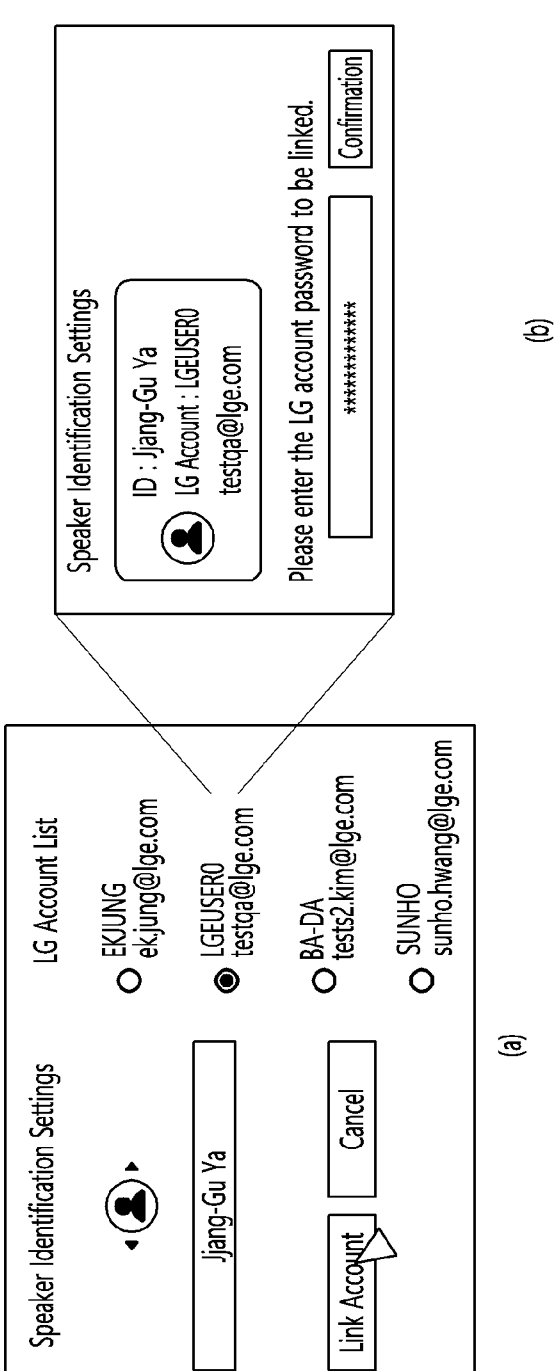
FIGS. 12 to 14 are views illustrating a method of interlocking the user-defined wake-up word and user information with each other according to an embodiment of the present disclosure.
Figure 14:
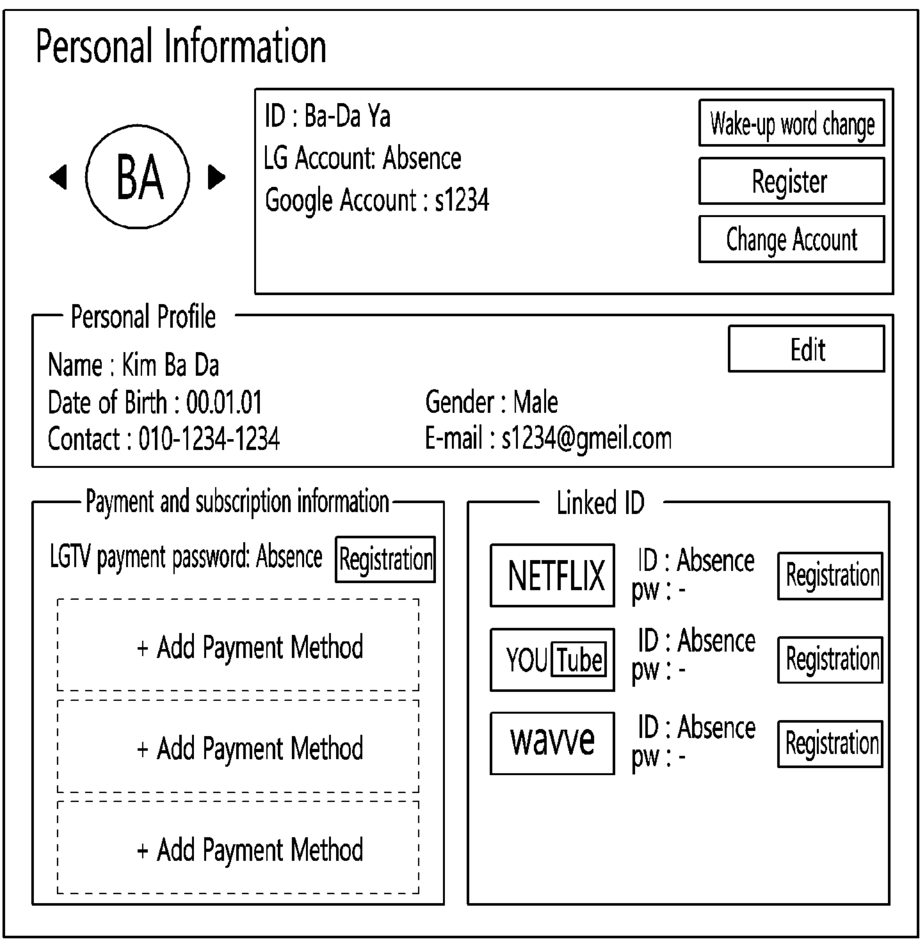

FIGS. 12 to 14 are views illustrating a method of interlocking the user defined wake-up word and user information with each other.

Figure 15:
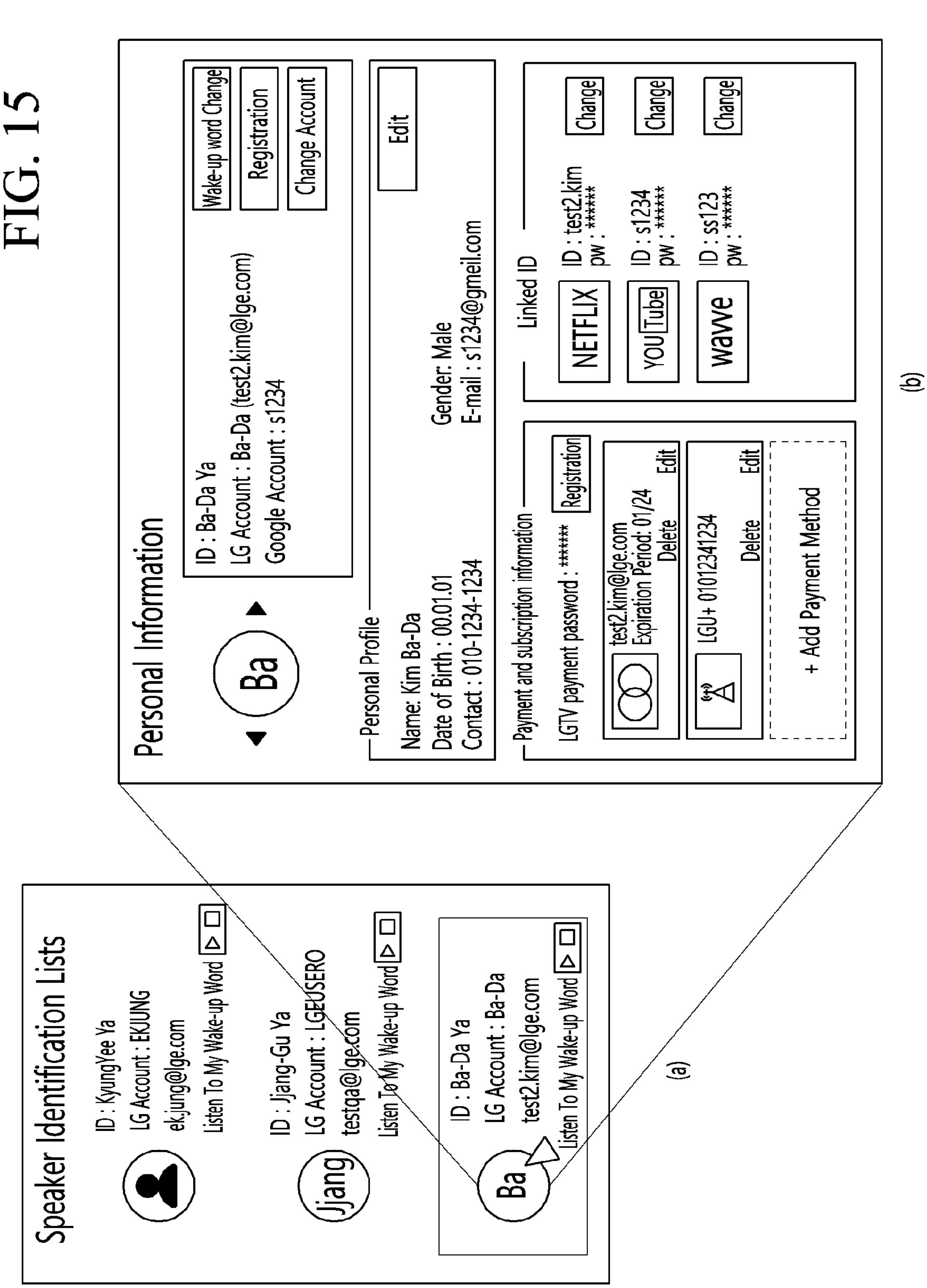
FIG. 15 is a view illustrating a user-defined wake-up word list, which is registered according to an embodiment of the present disclosure.
Figure 16:
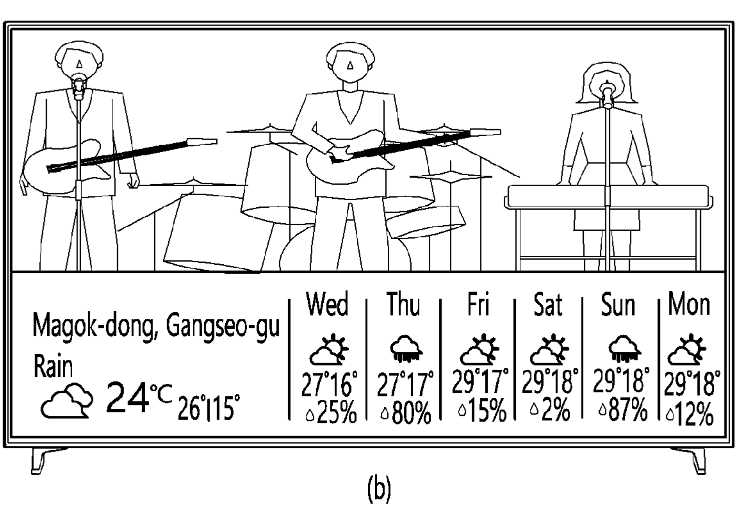

FIGS. 15 to 16 are views illustrating a user-defined wake-up word list, which is registered.

FIG. 12 illustrates a user interface provided by the artificial intelligence device 10 when linked to account information among user information in the process of registering the user-defined wake-up word (or after the registration).

Here, the account information may indicate, for example, login information of the artificial intelligence device 10, but is not limited thereto.

Referring to FIG. 12(*a*), the artificial intelligence device 10 may be configured to provide an account list linked together with the user-defined wake-up word.

If at least one account is selected from the account list provided in FIG. 12(*a*), the artificial intelligence device 10 may be configured to provide detailed information of the account as illustrated in FIG. 12(*b*). At least one of a user of an account, an address of an account, and a password of an account may be provided as account detailed information. In FIG. 12(*b*), when a confirmation button is accessed, the artificial intelligence device 10 may be configured to set and register the user-defined wake-up word to be linked to the corresponding account.

When the user is identified in the process of registering the user-defined wake-up word, the artificial intelligence device 10 may be configured to provide the account information of the corresponding user instead of the account list illustrated in FIG. 12(*a*). Alternatively, the artificial intelligence device 10 may be configured to process the user-defined wake-up word to be linked to the provision of the corresponding account information according to the selection.

Unlike FIG. 12, FIG. 13 is a diagram illustrating a method of interlocking with the user-defined wake-up word when the user goes through an account login procedure.

FIGS. 13(*a*) and 13(*b*) illustrate examples of a user interface screen provided by the artificial intelligence device 10 when the user logs in to an account.

Referring to the user interface illustrated in FIGS. 13(*a*) and 13(*b*), the artificial intelligence device 10 may be configured to provide a function (button) to enable a procedure of directly registering a user's calling word, that is, a user-defined wake-up word, without going through a separate route on an account login window.

If the user call word registration function is activated in FIG. 13(*a*), as illustrated in FIG. 13(*c*), the procedure for registering the user call word may be performed. FIG. 13(*c*) may be performed as in FIGS. 11(*b*) to 11(*e*).

In FIG. 13, the process of registering the user-defined wake-up word without going through another route during the account login process has been described. However, even if the user-defined wake-up word is already registered before the account login, a list of the registered user-defined wake-up words may be provided and linked according to selection in a manner similar to that illustrated in FIG. 12(*a*).

FIG. 14 illustrates an example of a user interface screen for personal information provided by the artificial intelligence device 10.

The user may register a user-defined wake-up word, link the registered user-defined remote information to account information, and change the linked account through the user interface of FIG. 14.

As shown in FIG. 14, the artificial intelligence device 10 may be configured to provide a service so that, when at least one user-defined wake-up word is linked to an account, personal information already linked to the account is also linked together or sequentially.

In the above, the personal information may include personal profile information, payment and subscription information, linked ID information, etc., but is not limited thereto.

The personal profile information may include information such as an account user name, a date of birth, a gender, contact information, and e-mail.

The payment and subscription information may include information such as a payment method and a payment password.

The linked ID information may include information such as ID/password of various paid or free over the top (OTT) services or applications.

When linking the user-defined wake-up word with the account information, the artificial intelligence device 10 may be configured to perform a service to selectively link some or all of the information already linked to the linked account. For example, the artificial intelligence device 10 may be configured to allow the user to be linked the selected portion with the user-defined wake-up word when a portion of information already linked to a corresponding account is selected.

Thus, when a plurality of user-defined wake-up words are linked to one account, the personal information that is activated when linked to the corresponding account may be different according to each user-defined wake-up word.

FIG. 15 illustrates an example of a user interface screen for providing a list of account information linked to the user-defined wake-up word in the artificial intelligence device 10.

The user may check the account information linked to the user-defined wake-up word on the artificial intelligence device 10 through the list in FIG. 15A and may listen to the user-defined wake-up word linked to the individual account according to the selection. The artificial intelligence device 10 may be configured to provide text data corresponding to the linked user-defined wake-up word.

The artificial intelligence device 10 may be configured to provide the list illustrated in FIG. 15(*a*) according to the login user, but accounts of other users and user-defined wake-up words linked thereto may be deactivated so that access is not possible. Alternatively, in the list illustrated in FIG. 15(*a*), the accounts of other users and the user-defined wake-up words linked thereto may be filtered so as to be excluded.

When any one account is selected from the list of FIG. 15(*a*), the personal information screen (detailed information screen) as illustrated in FIG. 15(*b*) may be provided. Here, the information and description of FIG. 15(*b*) are the same as those of FIG. 14, and thus, their duplicated descriptions will be omitted.

The artificial intelligence device 10 may be configured to register at least one user-defined wake-up word for one user. When a plurality of user-defined wake-up words are registered for one user, the artificial intelligence device 10 may be configured to group the user-defined wake-up words to manage the user-defined wake-up words together.

In operation S111, that is, the providing of the screen by the artificial intelligence device 10 may be performed simultaneously or independently of user-defined wake-up word registration fact return or report received from the NLP server 30.

The registration procedure of the unique user-defined wake-up word of FIG. 8 may be performed through a dedicated page for registering the wake-up word using a full-screen (or application execution screen).

In at least one of FIGS. 8 and 10 to 15, the procedure for registering the unique user-defined wake-up word may be performed a pop-up window or an OSD message window on the content currently provided by the artificial intelligence device 10.

In at least one of FIGS. 8 and 10 to 15, in the procedure of registering the unique user-defined wake-up word, the artificial intelligence device 10 may be configured to support a multi-view mode, and when the current mode is the multi-view mode, the registration procedure may be performed through one view, and the previous playback screen may or may not be continuously provided in another view.

The user may register the desired user-defined wake-up word rather than the wake-up word that is set by default and is not changed, i.e., the user-defined wake-up word to control the artificial intelligence device 10 by using the registered user-defined wake-up word. That is, the user may change the artificial intelligence device 10 into a personalized device by using the user-defined wake-up word together with a command to configure and use the artificial intelligence device 10 as desired.

The user may control the artificial intelligence device 10 through the command without inputting, i.e., uttering an additional wake-up word after changing the artificial intelligence device 10 to the personalized device through the user-defined wake-up word. In addition, the user may register a frequently used or desired command, a desired function, desired information, etc. as macros, and activate a macro function through the user-defined wake-up word to improve convenience of use. The control of the artificial intelligence device 10 or the activation of the macro function without additional utterance of the wake-up word may be combined with routine information such as time information and spatial information to determine the activation of the macro function.

The artificial intelligence device 10 may be configured to use various personal wake-up words like the personalized device suitable for the user in addition to the basic wake-up word through the user-defined wake-up word to improve the user's satisfaction. In addition, even in the artificial intelligence device 10 with a relatively large display, the personalization and personal history may be supported like a mobile device, and thus, favorite functions may be supported to be more easily and conveniently accessible and used to improve the user satisfaction. It is possible to try to differentiate from other people through the personal wake-up word using the unique word of oneself, and security according to the use of the artificial intelligence device 10 may be improved. In addition, the artificial intelligence device 10 and the user's other devices may be more easily linked through the personal wake-up word and processed together to improve the convenience of use.

Hereinafter, after the user-defined wake-up word is registered through the above process, an operation of the artificial intelligence device 10 according to its use will be described.

When the user registers the user-defined wake-up word (for example, "Jjang-gu ya") and the user's mobile device to utter "Jjang-gu ya, show me my phone", a screen of the user's mobile device may be provided on a screen of the artificial intelligence device 10, which is automatically unlinked in a mirroring manner.

In addition, when the user utters "Jjang-gu ya, show me my picture", the artificial intelligence device 10 may be configured to provide pictures selected by the user from pictures stored in at least one of the artificial intelligence device 10 and the user's mobile device.

In addition, when the user utters "My love, show me my favorite drama", the artificial intelligence device 10 may be configured to provide a list of the user's previous favorite drama (e.g., personal history is possible). Here, the favorite drama may include a case, in which a short drama is repeatedly watched, a case, in which multiple episodes of a long drama are watched, a case, in which, in the case of series, all of a series are watched, and the next series comes out, and the like.

The user may utter the user-defined wake-up word so as to be easily linked to the user's mobile device or a peripheral device (e.g., a sound bar, a wireless headset, etc.) without finding the user-defined wake-up word in the device list to select the user-defined wake-up word one by one.

Figure 9:
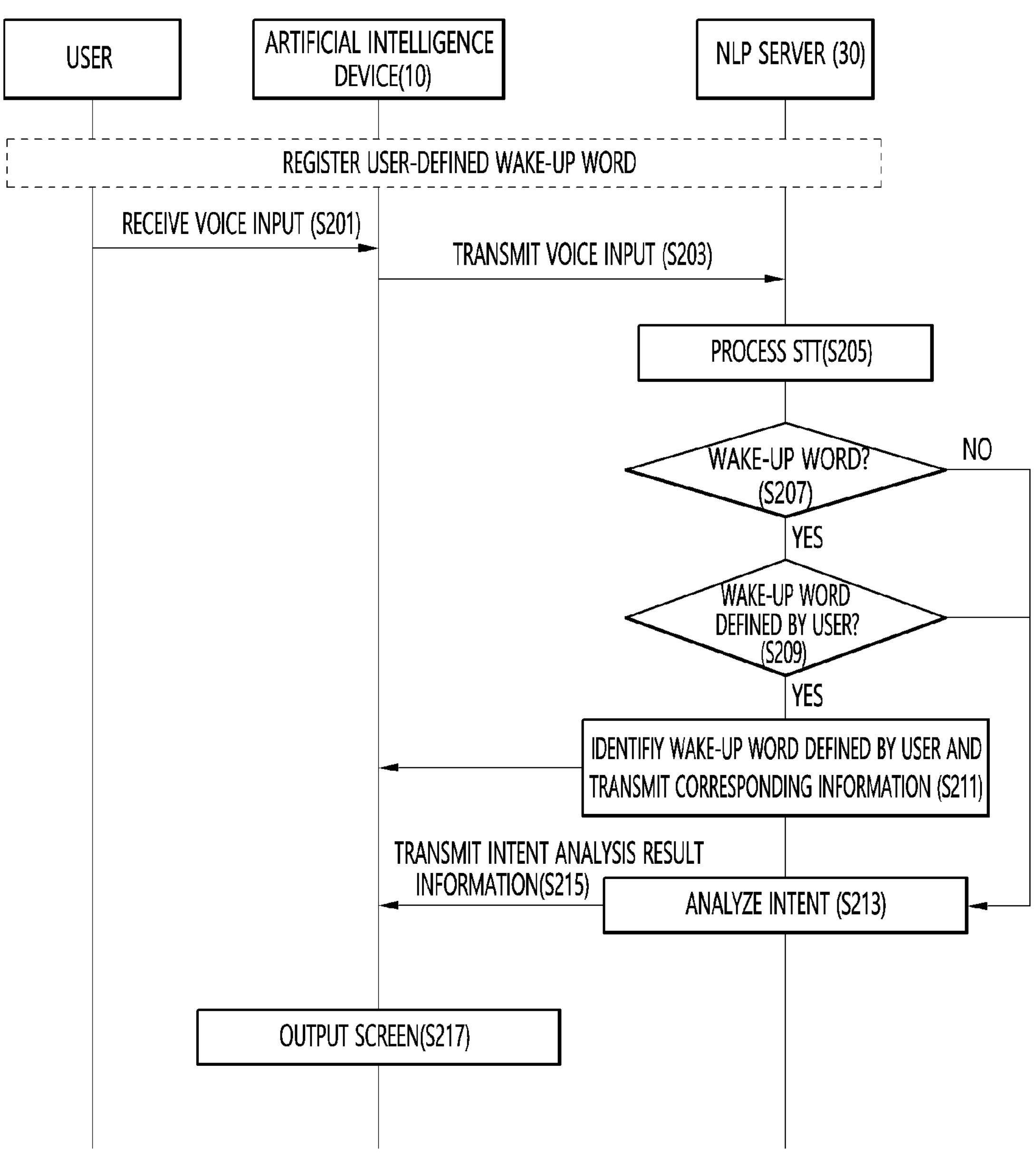
FIG. 9 is a view illustrating a method for using the user-defined wake-up word in the voice service system according to an embodiment of the present disclosure.

FIG. 9 is a view illustrating a method for using the user-defined wake-up word in the voice service system.

Figure 10:
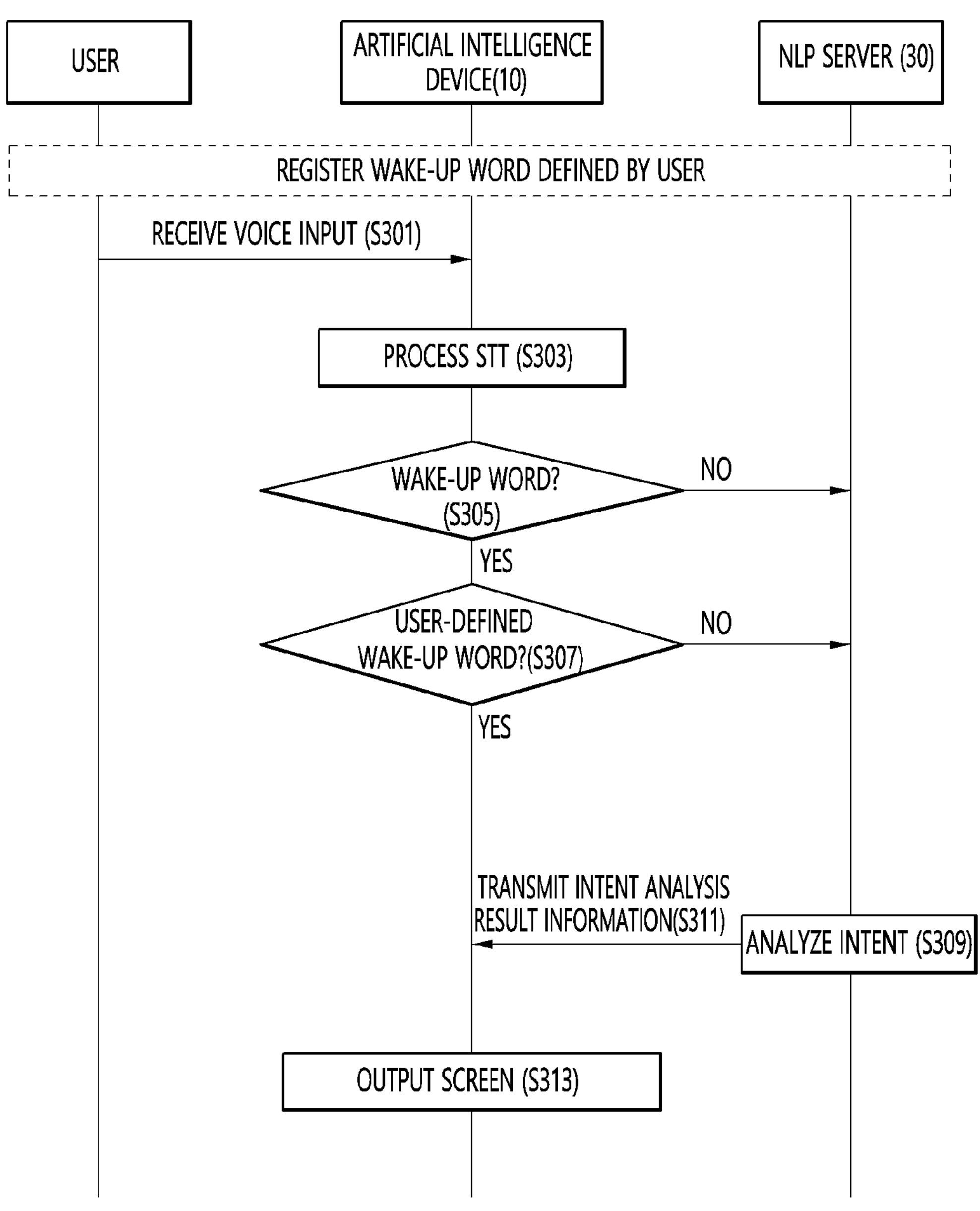
FIG. 10 is a view illustrating a method for using a user-defined wake-up word in a voice service system according to another embodiment of the present disclosure.

FIG. 10 is a view illustrating a method for using a user-defined wake-up word in a voice service system.

In FIGS. 9 and 10, it is assumed that the user-defined wake-up word has already been registered in a voice service system in FIGS. 8 and 10 to 15, which are described above.

An artificial intelligence device 10 may be configured to receive a voice input from a user (S201).

The artificial intelligence device 10 may be configured to transmit the received voice input to an NLP server 30 (S203).

The NLP server 30 may be configured to perform STT processing on the transmitted voice input (S205) and determine whether the voice input is a wake-up word (S207).

As a result of the determination in operation S207, when the corresponding voice input is the wake-up word, the NLP server 30 may be configured to determine whether the corresponding voice input is the wake-up word (S209).

As a result of the determination in operation S209, when the corresponding voice input is a user-defined wake-up word, the NLP server 30 may be configured to transmit information capable of identifying the user-defined remote and corresponding information to the artificial intelligence device 10 (S211).

The artificial intelligence device 10 may be configured to perform a corresponding operation based on the information transmitted from the NLP server 30 through operation S211.

The corresponding operation may include, for example, performing of login to an linked account, providing of linked account information, and the like.

On the other hand, as a result of the determination in operation S207, when the corresponding voice input is not the wake-up word, the NLP server 30 may be configured to analyze an intention on STT processing data for the corresponding voice input to generate intent analysis result information (S213).

The NLP server 30 may be configured to transmit intention analysis result information for the corresponding voice input to the artificial intelligence device 10 through operation S213 (S215).

The artificial intelligence device 10 may be configured to perform the corresponding operation based on the intention analysis result information transmitted through operation S213 and output a screen according to the performed corresponding operation (S217).

The corresponding operation may include an output (or recommendation information) of information or perform of a function (or recommendation function).

Alternatively, as a result of the determination in operation S209, if it is not the user-defined wake-up word, since it is a basic wake-up word, intention analysis on basic wake-up word identification information and command information after the basic wake-up word and intent analysis result information (S213) and transmit the intention analysis result information (S215). The artificial intelligence device 10 may be configured to determine the corresponding operation based on the intention analysis result information for the command according to the transmitted basic wake-up word to output a corresponding screen (S217).

In FIG. 9, STT processing and natural language processing process, that is, operations S205 to S211 may be performed in the NLP server 30, but in FIG. 10, the corresponding process may be performed in the artificial intelligence device 10. Therefore, the description of operations S303 to S307 corresponding to operations S205 to S211 of FIG. 9 described above in FIG. 10 may be denoted, and their duplicated descriptions will be omitted.

Referring to FIG. 10, when the artificial intelligence device 10 may be configured to receive a user's voice input (S301), the user's voice input may be directly processed (S303 to S307) without being transmitted to the NLP server 30.

That is, the artificial intelligence device 10 may be configured to directly perform the STT processing (S303) on the received voice input, determine whether it is the wake-up word (S305), and determine whether it is the user-defined wake-up word (S307).

As a result of the determination in operation S307, when the corresponding voice input is the user-defined wake-up word, the artificial intelligence device 10 may be configured to determine the corresponding operation to output a corresponding screen (S313).

However, the artificial intelligence device 10 may be configured to transmit the corresponding voice input to the NLP server 30 when the corresponding voice input is not the wake-up word in operation S305, and the NLP server 30 may be configured to analyze intention of the received voice input and generate intention analysis result information to return to the artificial intelligence device 10 (S311). The artificial intelligence device 10 may be configured to determine the corresponding operation based on the intention analysis result information returned in operation S311 and perform the corresponding operation to output a screen (S313).

Alternatively, as a result of the determination in operation S307, if it is not the user-defined wake-up word, since it is a basic wake-up word, intention analysis on basic wake-up word identification information and command information after the basic wake-up word and intent analysis result information (S309) and transmit the intention analysis result information (S211). The artificial intelligence device 10 may be configured to determine the corresponding operation based on the intention analysis result information for the command according to the transmitted basic wake-up word to output a corresponding screen (S313).

FIGS. 16 to 23 are views illustrating a method for operating the artificial intelligence device 10 according to use of the user-defined wake-up word list, which is registered.

The artificial intelligence device 10 may be configured to support scenarios for using a personalized command for each user.

That is, the artificial intelligence device 10 may be configured to support the use of the personal command with the wake-up word so that each family member registers his/her own TV nickname as the wake-up word. As a result, even though the wake-up word is uttered, the personalized command may be generated, and when a frequently used command is registered according to the wake-up word, even if saying the personal wake-up word (for example, don't have to utter a command that is frequently used for a long time), the artificial intelligence device 10 may be easily operated.

Conventionally, if the basic wake-up word "Hi LG" is uttered, and no command is uttered for a few seconds, a message that "The voice was not recognized. Please try again." may be provided. If the user utters "Ba-da ya" and does not utter a command for a few seconds through personalized registration, a pre-registered command "the latest BTS information on YouTube" may be executed.

FIG. 16(*a*) illustrates a list of the user-defined wake-up registered in the artificial intelligence device 10. Referring to FIG. 16(*a*), it is seen that a user (father) registers 'Jj ang-gu ya' as the user-defined wake-up word, a user (mother) registers 'TV ya' as the user-defined wake-up word, and a user (Me) registers 'My Love' as the user-defined wake-up word.

When the user utters the user-defined wake-up word or the basic long-distance wake-up word, the artificial intelligence device 10 may be configured to provide information about the user-defined wake-up word registered to the artificial intelligence device 10 as illustrated in FIG. 16(*a*) to use the user-defined wake-up word, thereby providing control convenience.

When the artificial intelligence device 10 is providing a content 1610, and the father (user) utters a voice including the user-defined wake-up word 'Jj ang-gu ya, how is the weather today?', as illustrated in FIG. 16(*b*), weather information 1620 may be provided along with the content 1610.

The command is weather information, and the weather information 1620 may be provided on an entire screen or overlaid on one area of the screen as illustrated in FIG. 16(*b*).

The artificial intelligence device 10 may be configured to extract the user-defined wake-up word from the above-described input. When a user mapped to the extracted user-defined wake-up word and a user currently logged in to the artificial intelligence device 10 are different from each other, the user may provide weather information after changing the login information, and the login information may be provided with information about the user of the corresponding voice input, that is, the father, on the weather information to be provided without being changed. In the latter case, if the user-defined wake-up word is included in the next voice input, and the user is the same as the user mapped to the user-defined wake-up word of the previous voice input, the login information of the artificial intelligence device 10 may be immediately changed. In the above, when the login information is changed, the corresponding content may be continuously provided or changed to a preset content along with the change in the login information, based on properties of the content being played before the change and the user information corresponding to the changed login information.

FIG. 17(*a*) illustrates personal information of the user who has registered the above-described user-defined wake-up word. Referring to FIG. 17(*a*), the user may set a response of the artificial intelligence device 10 when the user-defined wake-up word is uttered when or after registering the user-defined wake-up word. For example, in FIG. 17(*a*), when the user-defined wake-up word is input (or recognized), the operation of the artificial intelligence device 10 may include 'time and weather information', 'latest information on BTS in YouTube', 'Latest news' and the like as examples. However, the present disclosure is not limited to these operations, and the user may arbitrarily set and register all the operations supported by the artificial intelligence device 10 in advance.

When a call word (i.e., user-defined wake-up word) is uttered, the artificial intelligence device 10 may be configured to immediately perform the registered operation. Several of these operations may be registered, and the order may be determined.

However, the operation illustrated in FIG. 17(*a*) may be applied to a case in which the user-defined wake-up word is uttered for convenience, or applied a case in which an initial user-defined wake-up word is uttered, but is not limited thereto.

When the registered user-defined wake-up word is 'Ba-da', and a response setting registration content is 'latest BTS information on YouTube', as illustrated in FIG. 17(*b*), if the user utters 'Ba-da ya', the artificial intelligence device 10 may be configured to provide a progress bar and a guide message saying that 'when the progress bar is completed, the registered command is executed' on the screen of the currently playing content, and provide a content corresponding to the registered command as illustrated in FIG. 17(*c*).

In FIG. 17(*a*), if there is no content specially set as a response by the user in advance, any one of the operations in the setting registration list is executed, or an operation, which is most closely related to the currently playing content, or operations among the operations in the setting registration list or supported by the artificial intelligence device 10 may be sequentially reproduced and provided. The set-registered operation may be applied when the user-defined wake-up word is uttered for the first time, and thereafter, the operation highly related to the currently playing content may be automatically selected and provided as a response operation.

As described above, the artificial intelligence device 10 may be configured to register the response to the user's voice input to simply execute functions that are mainly used or enjoyed without the remote control device such as a remote control, thereby maximizing the convenience.

Unlike FIG. 16(*a*), FIG. 18(*a*) illustrates an information table, in which a command registered instead of the wake-up word and a command corresponding to the operation actually performed by the artificial intelligence device 10 when the corresponding registered command is recognized are mapped.

Referring to FIG. 18(*a*), the father may register 'Good morning' as a command instead of the wake-up word, and in this case, the artificial intelligence device 10 may be configured to recognize the command as 'Show me the latest news'. In addition, the mother may register 'Show me baby contents', and in this case, the artificial intelligence device 10 may be configured to recognize the command as 'Play Pororo song on YouTube'. In addition, it may be registered 'I'm going to watch a movie', and in this case, the artificial intelligence device 10 may be configured to recognize the command as 'Volume 50, movie screen change, and connect Bluetooth speaker that is registered by the user' commands.

As described above, since the first command in FIG. 18(*a*) replaces the user-defined wake-up word, the artificial intelligence device 10 may be configured to automatically execute the correspondingly mapped command when the command is recognized even if the user-defined wake-up word is not input.

Referring to FIG. 18(*b*), when the user utters 'Show me baby contents', the artificial intelligence device 10 may not have the basic wake-up word nor the user-defined wake-up word, but the corresponding utterance may correspond to the mother's wake-up word replacement command registered in FIG. 18(*a*). Thus, the artificial intelligence device 10 may be configured to recognize the corresponding utterance as 'Play Pororo song on Yutube' to provide a screen shown in FIG. 18(*b*).

FIG. 18(*a*) may be applied when a user-defined wake-up word has already been uttered by the corresponding user, and the login has been changed.

In some cases, it may be difficult or cumbersome for the user to utter an accurate search word or command for the artificial intelligence device 10 to operate, but the artificial intelligence device 10 may be used more conveniently by registering and mapping the command related to the output of desired information or the execution of the function.

The artificial intelligence device 10 may be configured to automatically register and operate the user-defined wake-up-response registration illustrated in FIG. 17, the wake-up word replacement command-command matching illustrated in FIG. 18, and the like, as learning results through an artificial intelligence engine from the user's usage pattern or history even if the user does not register the user-defined wake-up-response registration, the wake-up word replacement command-command matching illustrated, and the like. This may be seen as a kind of macro function.

Figure 19:
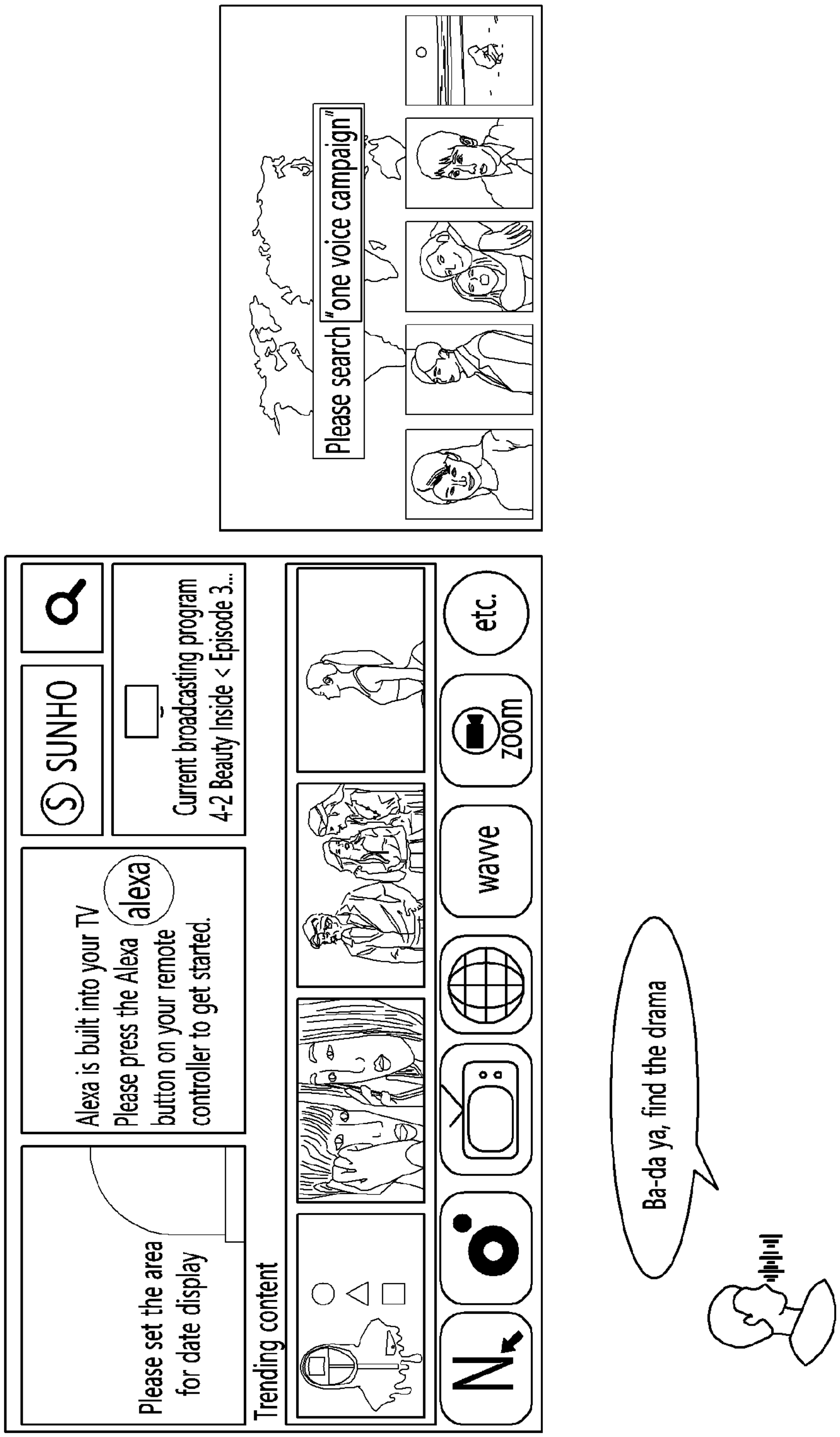
Figure 20:
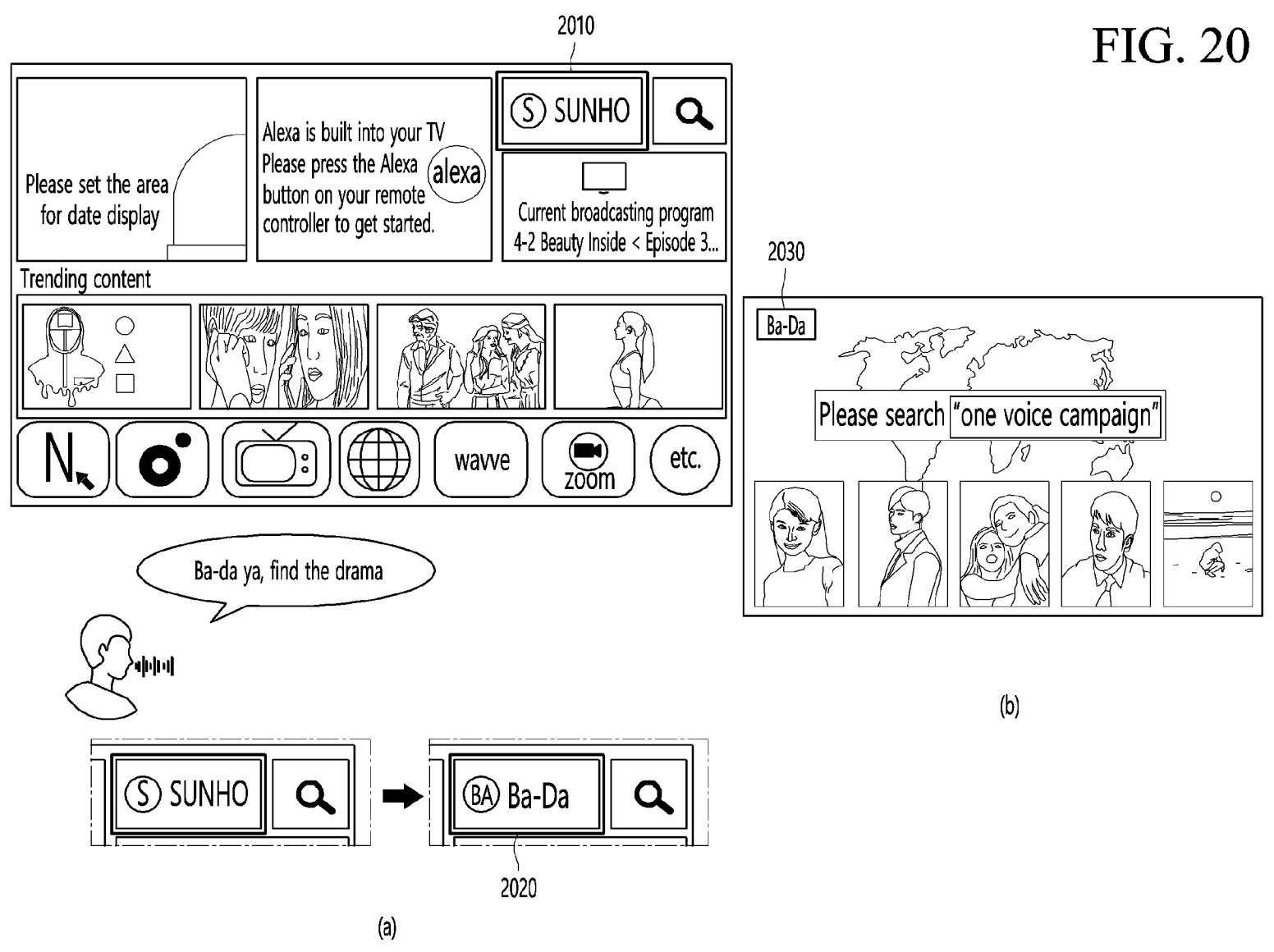

FIGS. 19 and 20 are views illustrating use scenarios in which information mapped to the user-defined wake-up word is used in the artificial intelligence device according to the recognition of user-defined wake-up word.

Referring to FIG. 19(*a*), the current account of the artificial intelligence device 10 is a user A. Here, if the user A says 'Ba-da ya, find a drama', a processing method is as follows. The artificial intelligence device 10 may be configured to identify the user-defined wake-up word, that is, 'Ba-da yo' from the uttered voice input and compare the identified user-defined wake-up word with the current account user information, and if the same, as illustrated in FIG. 19(*b*), a list of dramas that the corresponding user enjoys may be provided through the account of the linked corresponding user.

On the other hand, the user-defined wake-up word identified above and the current account user information may be compared with each other, and if do not the same, the artificial intelligence device 10 may be configured to change the currently accessed account 2010 into an account 2020 of a user (e.g., user B) linked to the user-defined wake-up word identified as illustrated in FIG. 20(*a*), and then, as illustrated in FIG. 20(*b*), the changed account information 2030 may be provided, and the list of dramas that the corresponding user enjoys may be provided through the corresponding account.

Figure 22:
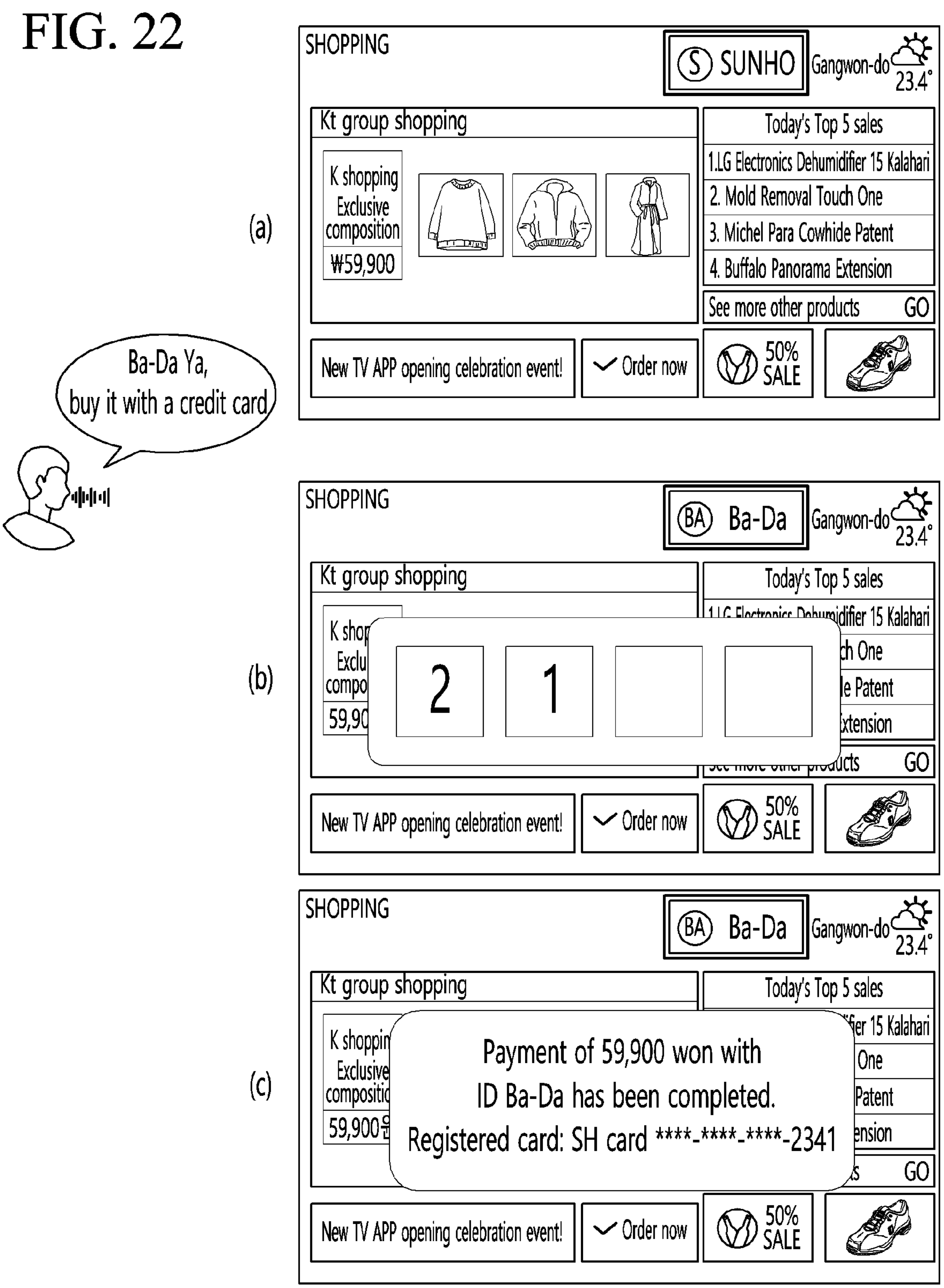

FIG. 21(*a*) illustrates a case in which the user utters 'Show me the sports alarm', FIG. 21(*b*) illustrates a case in which the user utters 'Show me the entertainment to be recommended', and FIG. 22 illustrates a case in which the user uttered 'Show me my schedule'.

In each case, the artificial intelligence device 10 may be configured to recognize the user-defined wake-up word or the command as illustrated in FIGS. 17 to 18 from the voice input to identify the user and then compare the identified user with the user of the current account. As a result, if an account change is required, desired information may be provided based on the user's history or history information through the corresponding account after the account change. For example, if the user A and the user B respectively input voice inputs such as "Show me sports alarms," an alarm for a sport called baseball may be provided to the user A, and an alarm for a sport called women's basketball may be provided, based on the personal information or the account information of each user.

The artificial intelligence device 10 may be configured to import schedule information to the linked account information to provide the schedule information as illustrated in FIG. 21(*c*).

In FIGS. 16 to 21, when the user determined from the voice input (based on the user-defined wake-up word or set-registered command) does not match the current account information, the artificial intelligence device 10 may be configured to automatically execute a multi-view mode for the convenience of the user of the current account to previously provide relevant information or function execution screens as described above, and when the user linked to the following command (e.g., user-defined wake-up, etc.) is one of the two, contents related to the user's account may be provided on the full screen.

Referring to FIG. 22(*a*), the user (current account) may utter a voice input while viewing the specific content, for example, the content such as home shopping. In this case, the voice input may be, for example, a command related to payment information. In this case, it is preferable that the user-defined wake-up word and the command are input when the user is not the user of the current account, but otherwise, the command may be sufficient.

In the screen of FIG. 22(*a*), when the user of which the account is currently logged into the artificial intelligence device 10 (user A, the user-defined wake-up word mapped with the user A is 'Ba-da') says 'Ba-da ya, purchase with a card', as illustrated in FIG. 22(*c*), even if separate card information is not called, or the payment process is not performed, the payment process for purchase with the card may be automatically performed, and 'Payment of 59,900 won with ID Ba-da has been completed. Registered card: Information such as SH card *-*-*-2341** may be provided.

Here, the artificial intelligence device 10 may be configured to operate, for example, based on the user's personal information (payment and subscription information) pre-mapped to the user-defined wake-up word as illustrated in FIGS. 14 and 15(*b*) described above.

However, in order to ensure stability of theft and/or payment in FIG. 22, the payment confirmation procedure may be performed at least once. For example, in FIG. 22(*b*), after digital numbers are output on the screen, a user's voice input for the corresponding digital numbers is received to perform user identification and authentication. Then, if there is no problem, payment may be completed automatically as in FIG. 22(*c*). The user-defined wake-up word registered by the corresponding user, rather than the digital number may be uttered at least once and used as a verification method. In this case, the artificial intelligence device 10 may be configured to proceed with important procedures such as the payment when all are accurately identified and recognized and verified for the provided number of times, but if the verification is required in performing other general functions, even if a threshold value or higher is identified and recognized, the corresponding function may be operated as it is.

FIG. 23 is a view illustrating an operation of a process of being linked to an external device in the artificial intelligence device 10 based on the user-defined wake-up word.

Referring to FIG. 23(*a*), the artificial intelligence device 10 may be configured to register settings for the external device to be mapped with the user-defined wake-up word.

When the artificial intelligence device 10 receives a voice input of 'Jjang-gu ya, connect the headset' (or 'Cjang-gu ya'), the user mapped to the user-defined wake-up word, which has ID: Jjang-gu ya in FIG. 23(*a*), the artificial intelligence device 10 may be configured to output a list of external devices previously registered in FIG. 23(*a*) by the user mapped to the user-defined wake-up word, output an inquiry message about whether or not to be connected as illustrated in FIG. 23(*b*), or automatically connect the external device as illustrated in FIG. 23(*c*).

The verification of the user-defined wake-up word will be described below.

The verification may be performed at the server 200, but is not limited thereto.

There may be a method in which the user directly inputs information on the user-defined wake-up word. When the user registers the user-defined wake-up word, the user may directly input the wake-up word to be registered as text and register the wake-up word so that the wake-up word text information is transmitted from the artificial intelligence device 10 to the server 200. Therefore, when the user-defined wake-up word is used, if the artificial intelligence device 10 converts the voice data uttered by the user into the STT to transmit the text information to the server, the text information may be compared with the text information directly input and transmitted by the aforementioned user so as to be verified.

When registering the user-defined wake-up word, there may be a method of obtaining the wake-up word information from the artificial intelligence device 10. When registering the user-defined wake-up word, the artificial intelligence device 10 may be configured to extract the text data through the STT while the user repeatedly utters several times (e.g., 4 times), and transmit the most uttered text data to the server 200. Thereafter, when the user-defined wake-up word is used, the artificial intelligence device 10 may be configured to convert voice data uttered by the user into the STT to compare the voice data with the text data transmitted to the server 200 so as to be verified.

When registering the user-defined wake-up word, the artificial intelligence device 10 may be configured to transmit the voice data itself to the server 200, and the server 200 may be configured to directly determine a degree of similarity. The artificial intelligence device 10 may be configured to transmit raw data to the server 200 as it is without performing the STT processing on the voice data for four times of the utterance when the user registers the user-defined wake-up word. Similarly, when the user-defined wake-up word is input, the artificial intelligence device 10 may be configured to transfer the voice data as it is to the server 200 so as to be verified through the similarity between the previously received voice data for the user-defined wake-up word and the received voice data in the server 200.

According to the user-defined wake-up word verification method at the server 200, the wake-up word information may be transmitted to the server 200 at a time point of the wake-up word registration. Thus, when the user continuously utters the wake-up word, the server 200 may be configured to separate the wake-up word from the command to respond to the continuous utterances, thereby improving service satisfaction.

Figure 24:
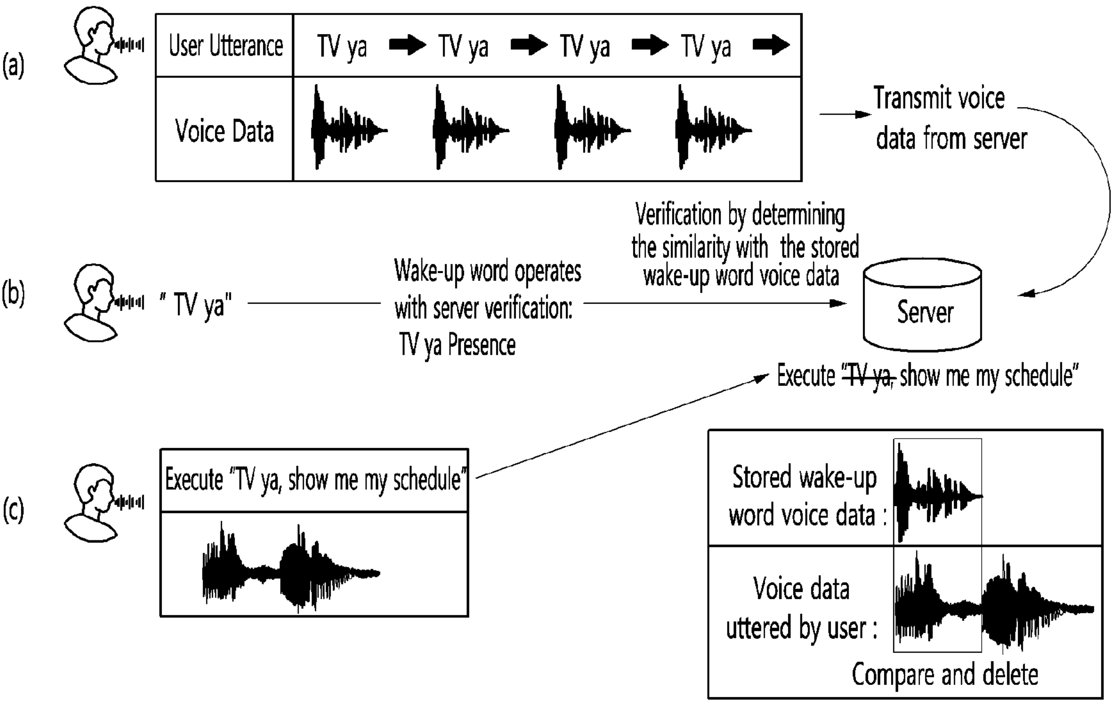

FIGS. 24 and 25 are views illustrating a method for processing the user-defined wake-up word list in the server 200.

As illustrated in FIG. 24(*a*), the artificial intelligence device 10 may be configured to repeatedly input a command of 'TV ya' (user-defined wake-up word) to register the user-defined wake-up word, corresponding voice data (e.g., including a voice waveform) may be transmitted to the server 200.

The server 200 may be configured to register the user-defined wake-up word transmitted by the artificial intelligence device 10. Here, the server 20 may be configured to previously receive information about various contents, macro information, and the like, which are described above with reference to FIGS. 8 to 23, by the artificial intelligence device 10 to register and store the information.

When the artificial intelligence device 10 receives a voice input of a command of 'TV ya', as illustrated in FIG. 24(*b*), the similarity between the voice data of the user-defined wake-up word and the previously received voice data may be determined through the server verification so as to be verified.

In FIG. 24(*c*), it is for a voice input ('TV ya, show me my schedule') with the user-defined wake-up word and the command, and the server 200 may be configured to verify the command of 'TV ya' as the user-defined wake-up word to separate the wake-up word from a command. Thus, the server 200 may be configured to transmit analysis result information for 'Show me my schedule' to the artificial intelligence device 10 according to a command other than the user-defined wake-up word. As shown in FIG. 24, although it is processed to be removed by comparing the voice data of the wake-up word stored in the server 200 with the voice waveform of the voice data uttered by the user, the present disclosure is not limited thereto.

FIG. 25(*a*) illustrates a mapping table of a user-defined wake-up word-external device. A Bluetooth headset/earphone has been exemplified as an external device, but is not limited thereto.

As illustrated in FIG. 25(*b*), when it is uttered with the user-defined wake-up word, e.g., when a utterance input of 'Jjang-gu ya, connect the headset' is received, the artificial intelligence device 10 may be configured to transmit the utterance input to the server 200, and the server 200 may be controlled to identify the user-defined wake-up word called 'Jjang-gu ya' according to the above-described verification method and recognize a user mapped to the identified user-defined wake-up word, thereby connecting the mapped Bluetooth headset (Logitech G435xx) to the user recognized in FIG. 25(*a*).

On the other hand, as illustrated in FIG. 25(*c*), when a normal utterance input ('Connect my headset') without the user-defined wake-up word is received, the artificial intelligence device 10 may be configured to transmit the normal utterance input to the server 200, and since there is no user-defined wake-up word in spite of FIG. 25(*a*), the server 200 may be controlled to connect a headset recently registered or connected in the artificial intelligence device 10 or a headset that is capable of being connected currently.

At least one of the operations performed by the artificial intelligence device 10 may be performed by the NLP server 30, and vice versa.

The order of at least some of the operations disclosed in this disclosure may be performed simultaneously or in a different order from the previously described order, or some of the operations may be omitted/added.

The above-described method may also be embodied as processor readable codes on a processor readable recording medium. Examples of the processor readable medium include read-only memory (ROM), random-access memory (RAM), CD-ROMs, magnetic tapes, floppy disks, and optical data storage devices.

In the above-described display device, the embodiments set forth therein are not so limitedly, but all or part of the embodiments can be selectively combined so as to derive many variations.

The invention claimed is:

1. An artificial intelligence device comprising:

a display; and a processor configured to control the display, wherein the processor is further configured to:

receive a word that is not already registered and that is to be registered as a wake-up word, wherein the received word is different from any default wake-up word that is already registered in the artificial intelligence device;

register the received word as a first wake-up word;

after the received word is registered, activate a voice recognition function based on the first wake-up word being received; and transmit the first wake-up word to a server.

2. The artificial intelligence device according to claim 1, wherein the processor is further configured to:

provide a voice recognition agent to register the word as the wake-up word;

register, via the voice recognition agent, the word input by a speaker; and map, via the voice recognition agent, the word input by the speaker.

3. The artificial intelligence device according to claim 2, wherein the processor is further configured to process information regarding the speaker to be linked to the word.

4. The artificial intelligence device according to claim 3, wherein the information regarding the speaker comprises at least one or more of account or login information, profile information, payment and subscription information, paid or free service or application information capable of being linked, external device information capable of being connected, or routine information.

5. The artificial intelligence device according to claim 4, wherein the processor is further configured to control macro information to be generated and stored so that at least one command is automatically executed with respect to the word.

6. The artificial intelligence device according to claim 5, wherein the processor is further configured to:

determine whether the first wake-up word is included in a user input that is received; and based on determining that the first wake-up word is included in the user input, extract a command other than the first wake-up word from the user input to compare the extracted command with the macro information.

7. The artificial intelligence device according to claim 6, wherein the processor is further configured to:

based on determining that the first wake-up word is included in the user input, determine whether the command is received within a predetermined time;

based on determining that the command is received within the predetermined time, perform an operation related to a first function corresponding to the command; and based on determining that the command is not received within the predetermined time, perform an operation related to a second function, wherein the second function is performed according to a second command with respect to a first command registered in the macro information.

8. A method of operating an artificial intelligence device, the method comprising:

providing a voice recognition agent;

receiving a word that is not already registered and that is to be registered as a wake-up word via the voice recognition agent, wherein the received word is different from any default wake-up word that is already registered in the artificial intelligence device;

registering the received word as a first wake-up word; and transmitting the first wake-up word to a server.

9. The method according to claim 8, wherein registering the received word as the first wake-up word comprises:

registering, via the voice recognition agent, the word input by a speaker; and mapping, via the voice recognition agent, the word input by the speaker.

10. The method according to claim 9, wherein mapping the word comprises processing information regarding the speaker to be linked to the word.

11. The method according to claim 10, wherein the information regarding the speaker comprises at least one or more of account or login information, profile information, payment and subscription information, paid or free service or application information capable of being linked, external device information capable of being connected, or routine information.

12. The method according to claim 11, wherein mapping the word further comprises generating and storing macro information so that at least one command is automatically executed with respect to the word.

13. The method according to claim 12, further comprising:

receiving a user input;

determining whether the first wake-up word is included in the user input; and based on determining that the first wake-up word is included in the user input, extracting a command other than the first wake-up word from the user input to compare the extracted command with the macro information.

14. The method according to claim 13, further comprising:

based on determining that the first wake-up word is included in the user input, determining whether the command is received within a predetermined time;

based on determining that the command is received within the predetermined time, performing an operation related to a first function corresponding to the command; and based on determining that the command is not received within the predetermined time, performing an operation related to a second function, wherein the second function is performed according to a second command with respect to a first command registered in the macro information.

15. An artificial intelligence voice service system comprising:

a server; and an artificial intelligence device configured to transmit data to the server or receive data from the server, wherein the artificial intelligence device comprises:

a processor configured to provide a voice recognition agent, receive a word that is not already registered and that is to be registered as a wake-up word via the voice recognition agent, wherein the received word is different from any default wake-up word that is already registered in the artificial intelligence device, register the received word as a first wake-up word, and transmit the first wake-up word to the server.

* * * * *